United States Patent
Fukuta

(10) Patent No.: US 9,998,902 B2
(45) Date of Patent: Jun. 12, 2018

(54) MOBILE COMMUNICATION SYSTEM, USER TERMINAL, BASE STATION, AND PROCESSOR TRANSMITTING A DISCOVERY-USE SIGNAL

(71) Applicant: KYOCERA CORPORATION, Kyoto (JP)

(72) Inventor: Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 14/758,919

(22) PCT Filed: Dec. 24, 2013

(86) PCT No.: PCT/JP2013/084546
§ 371 (c)(1),
(2) Date: Jul. 1, 2015

(87) PCT Pub. No.: WO2014/106936
PCT Pub. Date: Jul. 10, 2014

(65) Prior Publication Data
US 2015/0341774 A1 Nov. 26, 2015

Related U.S. Application Data

(60) Provisional application No. 61/748,300, filed on Jan. 2, 2013.

(51) Int. Cl.
*H04W 8/00* (2009.01)
*H04W 72/04* (2009.01)
(Continued)

(52) U.S. Cl.
CPC ......... *H04W 8/005* (2013.01); *H04W 52/283* (2013.01); *H04W 72/048* (2013.01); *H04W 88/06* (2013.01); *H04W 88/10* (2013.01)

(58) Field of Classification Search
CPC . H04W 8/005; H04W 52/283; H04W 72/048; H04W 88/06; H04W 88/10
(Continued)

(56) References Cited

U.S. PATENT DOCUMENTS

2007/0104214 A1 5/2007 Hsieh et al.
2009/0323648 A1* 12/2009 Park ................. H04W 8/005
370/338

(Continued)

FOREIGN PATENT DOCUMENTS

JP 2012-514435 A 6/2012
JP 2013-526157 A 6/2013
(Continued)

OTHER PUBLICATIONS

An Office Action; "Notice of Reasons for Rejection," issued by the Japanese Patent Office dated Aug. 11, 2015, which corresponds to Japanese Patent Application No. 2014-555452 and is related to U.S. Appl. No. 14/758,919; with English language statement of relevance.

(Continued)

*Primary Examiner* — Michael Mapa
(74) *Attorney, Agent, or Firm* — Studebaker & Brackett PC

(57) ABSTRACT

A mobile communication system that comprises: a base station that manages a cell; a user terminal connectable to the cell; and another user terminal that can communicate, via the base station, with the user terminal, and that supports D2D communication that is direct device-to-device communication, wherein the user terminal starts transmitting a discovery-use signal for the D2D communication when it is determined that the user terminal and the other user terminal (Continued)

exist in the vicinity while the user terminal communicates with the other user terminal connected to a neighbor cell adjacent to the cell.

8 Claims, 14 Drawing Sheets

(51) Int. Cl.
*H04W 52/28* (2009.01)
*H04W 88/10* (2009.01)
*H04W 88/06* (2009.01)

(58) Field of Classification Search
USPC ......... 455/41.2, 426.1, 436–445, 450–452.1; 370/252, 331
See application file for complete search history.

(56) References Cited

U.S. PATENT DOCUMENTS

| | | |
|---|---|---|
| 2010/0165882 A1 | 7/2010 | Palanki et al. |
| 2011/0258313 A1 | 10/2011 | Mallik et al. |
| 2012/0115518 A1 | 5/2012 | Zeira et al. |
| 2012/0163235 A1* | 6/2012 | Ho ...................... H04W 76/023 370/254 |
| 2013/0016629 A1* | 1/2013 | Mallik .................. H04W 8/005 370/255 |
| 2013/0170414 A1* | 7/2013 | Kwon .................. H04W 72/042 370/311 |
| 2014/0057670 A1* | 2/2014 | Lim ...................... H04W 8/005 455/509 |
| 2015/0055634 A1 | 2/2015 | Zeira et al. |
| 2015/0133133 A1 | 5/2015 | Isobe et al. |

FOREIGN PATENT DOCUMENTS

| | | | |
|---|---|---|---|
| JP | 2013-223193 A | 10/2013 | |
| WO | 2012/060934 A2 | 5/2012 | |
| WO | WO 2012150815 A2 * | 11/2012 | ............ H04W 8/005 |

OTHER PUBLICATIONS

International Search Report, PCT/JP2013/084546, dated Jan. 28, 2014.
Written Opinion of the International Searching Authority, PCT/JP2013/084546, dated Jan. 28, 2014.
3rd Generation Partnership Project; Technical Specification Group SA; Feasibility Study for Proximity Services (ProSe), 3GPP TR 22.803 V0.3.0 (May 2012).
The extended European search report issued by the European Patent Office dated Aug. 9, 2016, which corresponds to European Patent Application No. 13870191.7-1854 and is related to U.S. Appl. No. 14/758,919.

\* cited by examiner

FIG. 7A eNB200-1

|   | NEIGHBOR CELL ID |
|---|---|
| 1 | 250-2 |
| 2 | ... |
| 3 | ... |
| 4 | ... | eNB200-2

|   | NEIGHBOR CELL ID |
|---|---|
| 1 | 250-1 |
| 2 | ... |
| 3 | ... |
| 4 | ... |

FIG. 7B eNB200-1

|   | COMMUNICATION UE ID | COMMUNICATION PARTNER UE ID | COMMUNICATION PARTNER CONNECTION CELL ID |
|---|---|---|---|
| 1 | 100-1 | 100-2 | 250-2 |
| 2 | ... | ... | ... |
| 3 | ... | ... | ... |
| 4 | ... | ... | ... | eNB200-2

|   | COMMUNICATION UE ID | COMMUNICATION PARTNER UE ID | COMMUNICATION PARTNER CONNECTION CELL ID |
|---|---|---|---|
| 1 | 100-2 | 100-1 | 250-1 |
| 2 | ... | ... | ... |
| 3 | ... | ... | ... |
| 4 | ... | ... | ... |

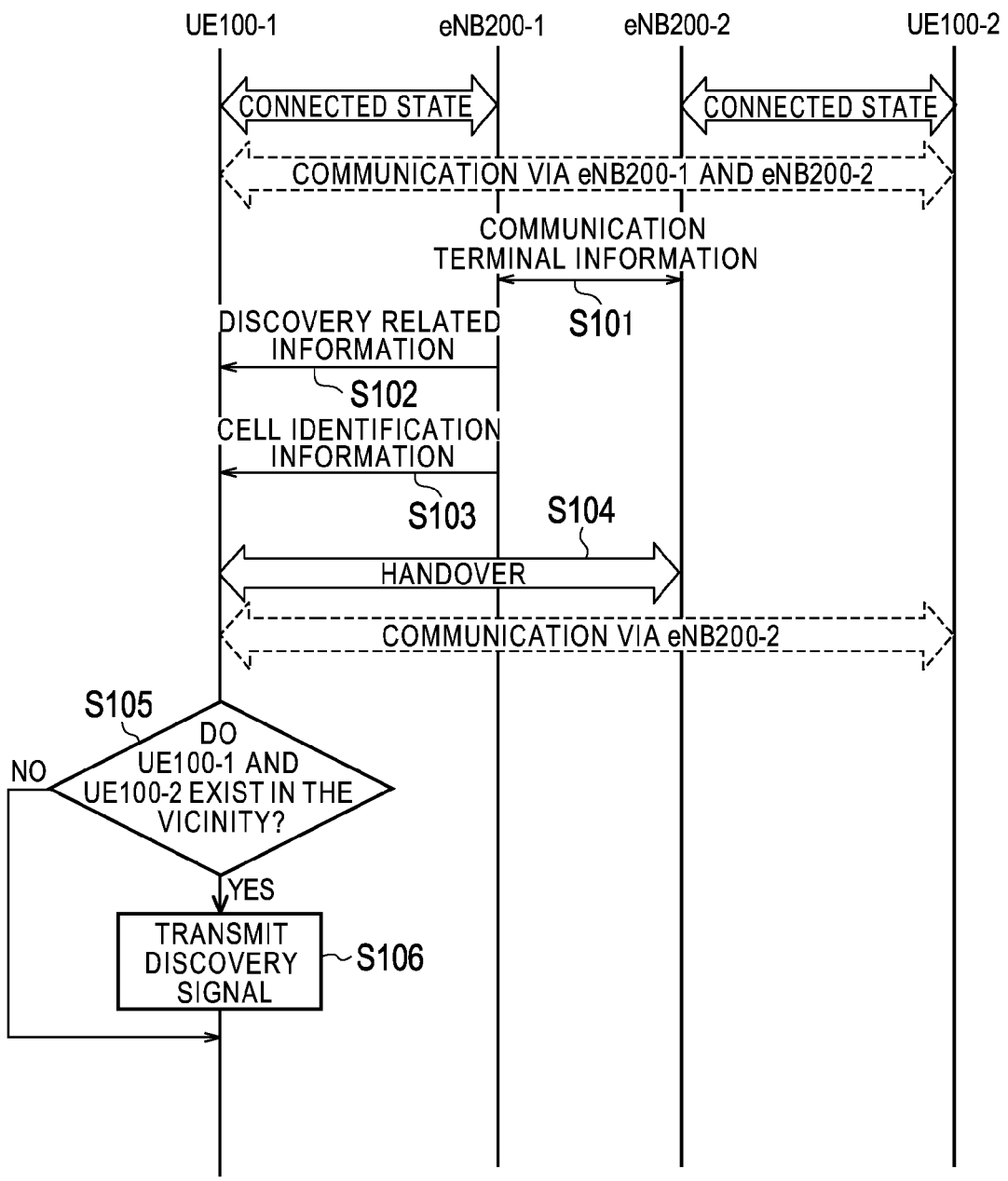

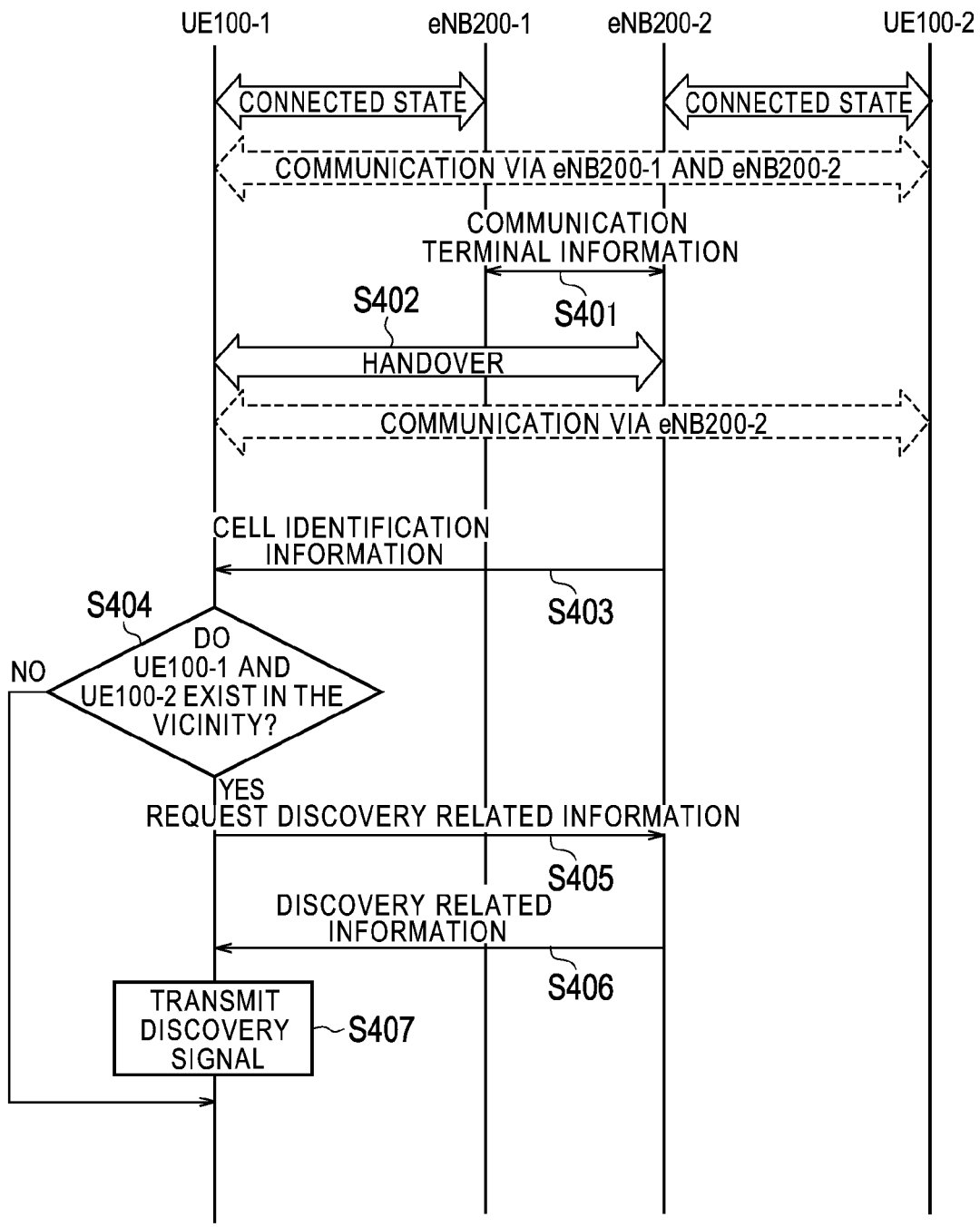

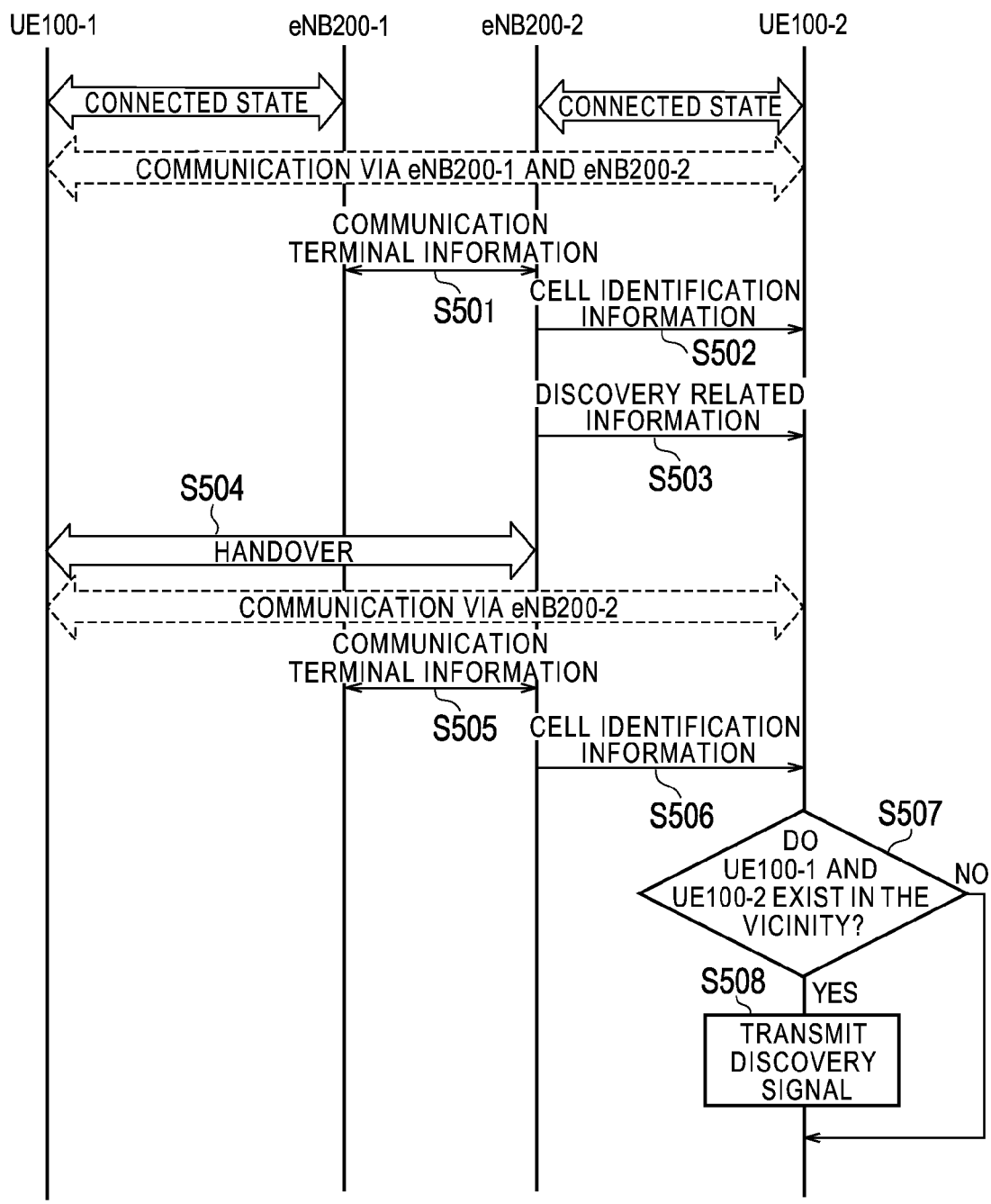

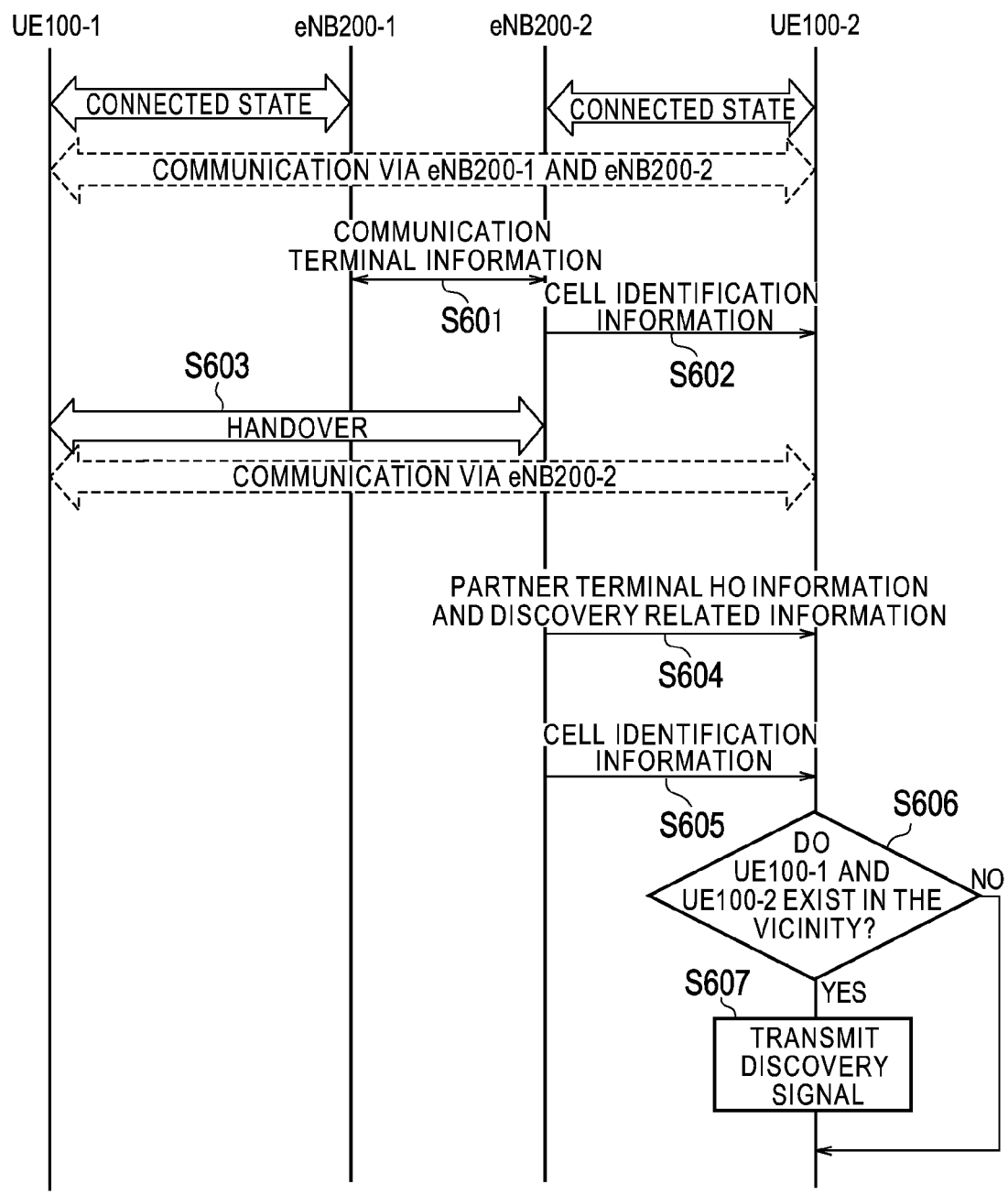

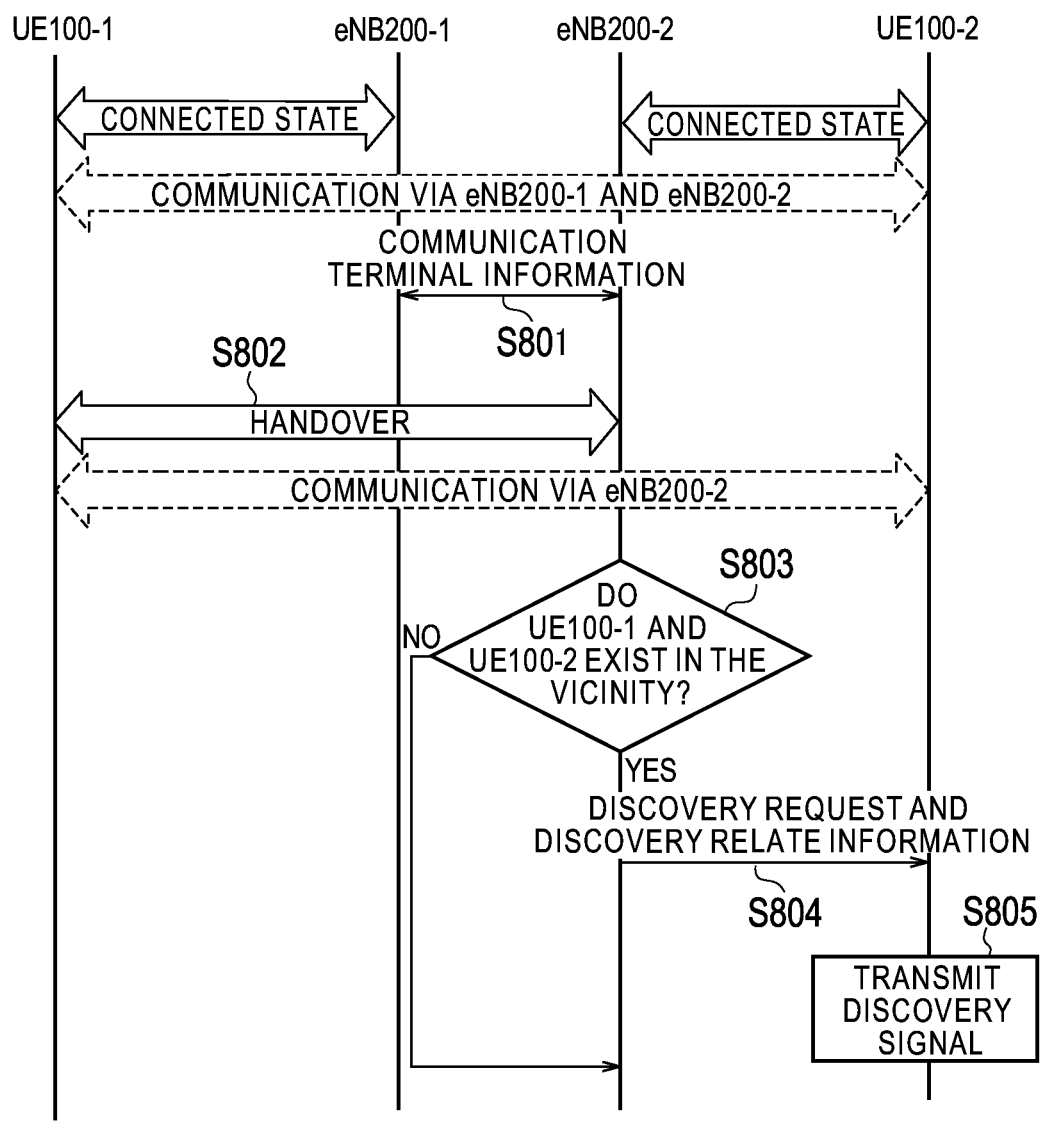

MOBILE COMMUNICATION SYSTEM, USER TERMINAL, BASE STATION, AND PROCESSOR TRANSMITTING A DISCOVERY-USE SIGNAL

TECHNICAL FIELD

The present invention relates to a mobile communication system that supports D2D communication, a user terminal thereof, a base station thereof, and a processor thereof.

BACKGROUND ART

In 3GPP (3rd Generation Partnership Project) which is a project aiming to standardize a mobile communication system, the introduction of Device to Device (D2D) communication is discussed as a new function after Release 12 (see non patent document).

In the D2D communication, a plurality of adjacent user terminals perform direct radio communication in a frequency band assigned to a mobile communication system. It is noted that the D2D communication is also called proximity service (Proximity Service) communication.

A user terminal transmits a discovery-use signal in order to discover a communication partner terminal in the D2D communication. When another user terminal that receives the discovery-use signal transmits a response signal to the user terminal, the user terminal can discover the communication partner terminal in the D2D communication.

PRIOR ART DOCUMENT

Non-Patent Document

Non Patent Document 1: 3GPP technical report "TR 22.803 V0.3.0" May 2012

SUMMARY OF THE INVENTION

However, when another user terminal does not exist in the vicinity of the user terminal, it is not possible to discover a communication partner terminal in the D2D communication even no matter when the user terminal transmits the discovery-use signal. Therefore, there is a problem in that the user terminal transmits a wasteful discovery-use signal.

Thus, the present invention provides a mobile communication system capable of transmitting a discovery-use signal at an appropriate timing, a user terminal thereof, a base station thereof, and a processor therefor.

A mobile communication system according to an embodiment that comprises: a base station that manages a cell; a user terminal connectable to the cell; and another user terminal that can communicate, via the base station, with the user terminal, and that supports D2D communication that is direct device-to-device communication. The user terminal starts transmitting a discovery-use signal for the D2D communication, when it is determined that the user terminal and the other user terminal exist in the vicinity while the user terminal communicates with the other user terminal connected to a neighbor cell adjacent to the cell.

BRIEF DESCRIPTION OF THE DRAWINGS

FIG. 7A is a diagram illustrating an example of a neighbor cell list.
FIG. 7B is a diagram illustrating an example of a communication terminal list.
FIG. 8 is a sequence diagram illustrating an operation example of a mobile communication system according to the first embodiment.
FIG. 11 is a sequence diagram illustrating an operation example of a mobile communication system according to a third modification of the first embodiment.
FIG. 13 is a sequence diagram illustrating an operation example of a mobile communication system according to the second embodiment.
FIG. 14 is a sequence diagram illustrating an operation example of a mobile communication system according to a modification of the second embodiment.
FIG. 16 is a sequence diagram illustrating an operation example of a mobile communication system according to a modification of the third embodiment.

DESCRIPTION OF THE EMBODIMENT

Overview of Embodiment

Figure 1:
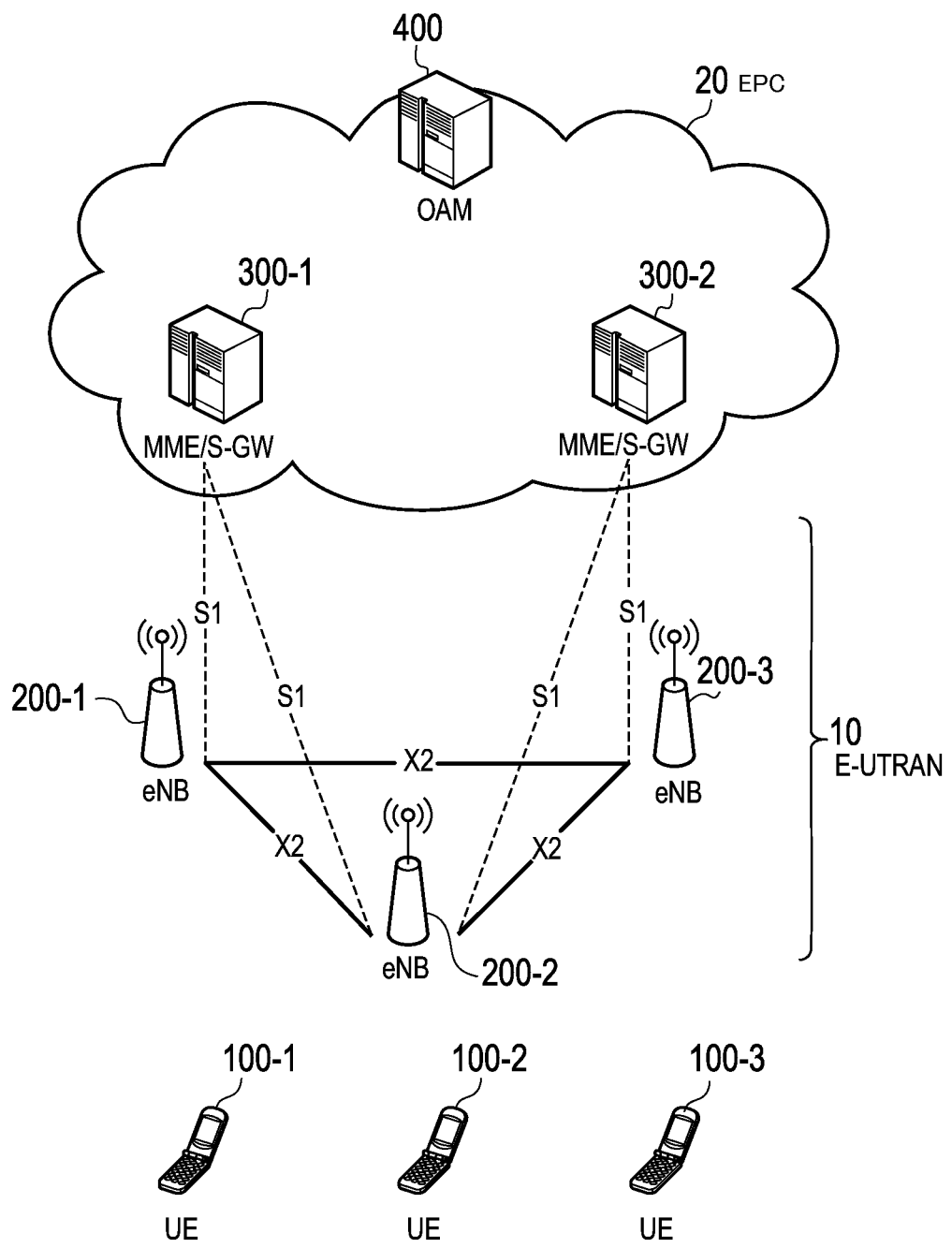
FIG. 1 is a configuration diagram of an LTE system.

A mobile communication system according to an embodiment includes: a base station (for example, eNB 200-1) that manages a cell (for example, a cell 250-1); a user terminal (for example, UE 100-1) connectable to the cell; and another user terminal (for example, UE 100-2) that can communicate via the base station with the user terminal, and supports D2D communication that is a direct device-to-device communication. The user terminal starts transmitting a discovery-use signal for the D2D communication when it is determined that the user terminal exists in the vicinity of the other user terminal while the user terminal communicates with the other user terminal connected to a neighbor cell (for example, a cell 250-2) adjacent to the cell. As a result, when it is determined that the user terminal and the other user terminal exist in the vicinity, it is highly likely that the other user terminal receives the discovery-use signal transmitted from the user terminal. Therefore, the user terminal is capable of transmitting the discovery-use signal at an appropriate timing without a need of transmitting a wasteful discovery-use signal.

In first and second embodiments, the base station (for example, eNB 200-1) transmits, to the user terminal, cell identification information indicating a connection cell (for example, the cell 250-2) connected by the other user terminal (for example, UE 100-2), and the user terminal determines whether or not the user terminal and the other user terminal exist in the vicinity on the basis of the cell identification information. As a result, the user terminal makes its own determination on the basis of the cell identification information, and thus, it is possible for the user terminal to transmit the discovery-use signal at an appropriate timing.

In the first embodiment, the user terminal (UE 100-1) determines that the user terminal and the other user terminal exist in the vicinity, when a handover was executed to the connection cell (cell 250-2) connected by the other user terminal (UE 100-2). As a result, the user terminal and the other user terminal exist in the identical cell, and thus, it is highly likely that the other user terminal exists in the vicinity of the user terminal. Therefore, it is highly likely that the other user terminal receives the discovery-use signal transmitted from the user terminal, and the user terminal is capable of transmitting the discovery-use signal at an appropriate timing.

In the first embodiment, the user terminal (UE 100-1) determines that the user terminal and the other user terminal (UE 100-2) exist in the vicinity when a reception level of a reference signal transmitted from the connection cell (cell 250-2) reaches a predetermined threshold value. As a result, the user terminal is capable of transmitting the discovery-use signal when it is possible to determine that the user terminal exists in the connection cell connected by the other user terminal even when a handover is not executed, and thus, it is possible for the user terminal to transmit the discovery-use signal at an appropriate timing.

In the first embodiment, the predetermined threshold value is a threshold value that acts as a trigger to report a measurement value relating to the reception level of the reference signal to the base station (eNB 200-1). The trigger for reporting the measurement value is utilized as a criteria to execute a handover, and thus, the user terminal exists in the connection cell of the other user terminal or exists in the vicinity of the connection cell of the other user terminal, and as a result, it is highly likely that the user terminal and the other user terminal exist in the vicinity. Therefore, the user terminal is capable of transmitting the discovery-use signal at an appropriate timing.

In the first embodiment, the predetermined threshold value is a threshold value designated by the base station (eNB 200-1). As a result, the base station is capable of controlling a timing at which the discovery-use signal is transmitted.

In an embodiment, the base station (for example, eNB 200-1) transmits, to the user terminal (for example, UE 100-1), related information including at least one item of information of a radio resource and information of transmission power used when the discovery-use signal is transmitted, and the user terminal transmits the discovery-use signal corresponding to the related information. As a result, it is possible to restrain the discovery-use signal from becoming an interference signal to another user terminal existing in the vicinity of the user terminal.

In the first embodiment, the neighbor cell (cell 250-2) is managed by a neighbor base station (eNB 200-2) adjacent to the base station (eNB 200-1), the neighbor base station transmits, to the user terminal, related information including at least one item of information of a radio resource and information of transmission power used when the discovery-use signal is transmitted, when the user terminal (UE 100-1) executed a handover to the neighbor cell. As a result, the user terminal that executes a handover to the neighbor cell receives the related information from the neighbor base station that manages the neighbor cell, and thus, it is possible to receive the related information more surely than a case where the related information is received from the base station.

In the first embodiment, the base station (eNB 200-1) transmits the related information, together with the cell identification information. As a result, the user terminal is capable of starting transmitting the discovery-use signal by using the related information transmitted together with the cell identification information, when it is determined, on the basis of the received cell identification information, that another user terminal exists in the vicinity.

In the first embodiment, the base station (eNB 200-1) transmits the related information when there is a request for the related information from the user terminal (UE 100-1). As a result, the base station may transmit the related information only when it is necessary, and thus, it is possible to reduce a load of the base station.

In a second embodiment, the base station (eNB 200-2) transmits the cell identification information to the user terminal (UE 100-2) when the other user terminal (UE 100-1) executed a handover. As a result, the user terminal is capable of determining that a connection target of the other user terminal was changed, and thus, it is possible to avoid a situation of making an erroneous determination that the user terminal and the other user terminal exist in the vicinity on the basis of the cell identification information obtained before the other user terminal executes a handover. Therefore, the user terminal is capable of eliminating a need of transmitting a wasteful discovery-use signal, and the user terminal is capable of transmitting the discovery-use signal at an appropriate timing.

In a third embodiment, the base station (eNB 200-2) transmits, to the user terminal, information indicating that the user terminal (UE 100-2) and the other user terminal (UE 100-1) exist in the vicinity or a request for transmitting the discovery-use signal when the user terminal and the other user terminal exist in the vicinity, and the user terminal starts transmitting a discovery-use signal for the D2D communication on the basis of the information or the request. As a result, the base station is capable of controlling a timing at which the discovery-use signal is transmitted.

In an embodiment, the user terminal (for example, UE 100-1) preferentially transmits data to the base station when a timing at which the discovery-use signal is transmitted and a timing at which the data is transmitted to the base station (for example, eNB 200-1) overlap. As a result, even a user terminal not capable of simultaneously transmitting the discovery-use signal and transmitting the data to the base station is capable of preferentially transmitting the data to the base station, and thus, it is possible to transmit the discovery-use signal without disturbing communication with another user terminal.

In an embodiment, the user terminal in a mobile communication system that comprises: a base station (for example, eNB 200-1) that manages a cell (for example, a cell 250-1); a user terminal (for example, UE 100-1) connectable to the cell; and another user terminal (for example, UE 100-2) that can communicate via the base station with the user terminal, and that supports D2D communication that is a direct device-to-device communication, comprises a control unit that starts transmitting a discovery-use signal for the D2D communication, when it is determined that the user terminal and the other user terminal exist in the vicinity, while communicating via the base station with the other user terminal connected to a neighbor cell (for example, a cell 250-2) adjacent to the cell.

In an embodiment, the base station in a mobile communication system that comprises: a base station (for example, eNB 200-1) that manages a cell (for example, a cell 250-1); a user terminal (for example, UE 100-1) connectable to the cell; and another user terminal (for example, UE 100-2) that can communicate via the base station with the user terminal, and supports D2D communication that is a direct device-to-device communication, comprises a control unit that transmits, to the user terminal, a request for transmitting information of a connection cell (for example, a cell 250-2) associated with the connection cell connected to the other user terminal or a request for transmitting a discovery-use signal for the D2D communication, while the user terminal communicates via the base station with the other user terminal connected to a neighbor cell (for example, a cell 250-2) adjacent to the cell, wherein the connection cell information and the request are used by the user terminal to transmit the information.

In an embodiment, the connection cell information includes cell identification information indicating the connection cell (for example, a cell 250-2) or/and information indicating that the user terminal (for example, UE 100-1) and the other user terminal (for example, UE 100-2) exist in the vicinity.

In an embodiment, a processor (a processor 160) provided in a user terminal (for example, UE 100-1) in a mobile communication system that comprises: a base station (for example, eNB 200-1) that manages a cell (for example, a cell 250-1); the user terminal connectable to the cell; and another user terminal (for example, UE 100-2) that can communicate via the base station with the user terminal, and supports D2D communication that is a direct device-to-device communication, starts a process for transmitting a discovery-use signal for the D2D communication, when it is determined that the user terminal and the other user terminal exist in the vicinity while the user terminal communicates via the base station with the other user terminal connected to a neighbor cell (for example, a cell 250-2) adjacent to the cell.

In an embodiment, a processor (a processor 240) provided in a base station (for example, eNB 200-1) in a mobile communication system that comprises: the base station that manages a cell (for example, a cell 250-1); a user terminal (for example, UE 100-1) connectable to the cell; and another user terminal (for example, UE 100-2) that can communicate via the base station with the user terminal, and supports D2D communication that is a direct device-to-device communication, executes a process for transmitting, to the user terminal, a request for transmitting connection cell information associated with a connection cell connected to the other user terminal or a request for transmitting a discovery-use signal for the D2D communication, while the user terminal communicates via the base station with the other user terminal connected to a neighbor cell (for example, a cell 250-2) adjacent to the cell, wherein the connection cell information and the request are used by the user terminal to transmit the information.

Hereinafter, with reference to the accompanying drawings, the following description will be provided for each embodiment when D2D communication is introduced to a cellular mobile communication system (hereinafter, an "LTE system") configured according to the 3GPP standards.

First Embodiment

Hereinafter, a first embodiment will be described.
(LTE System)
FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
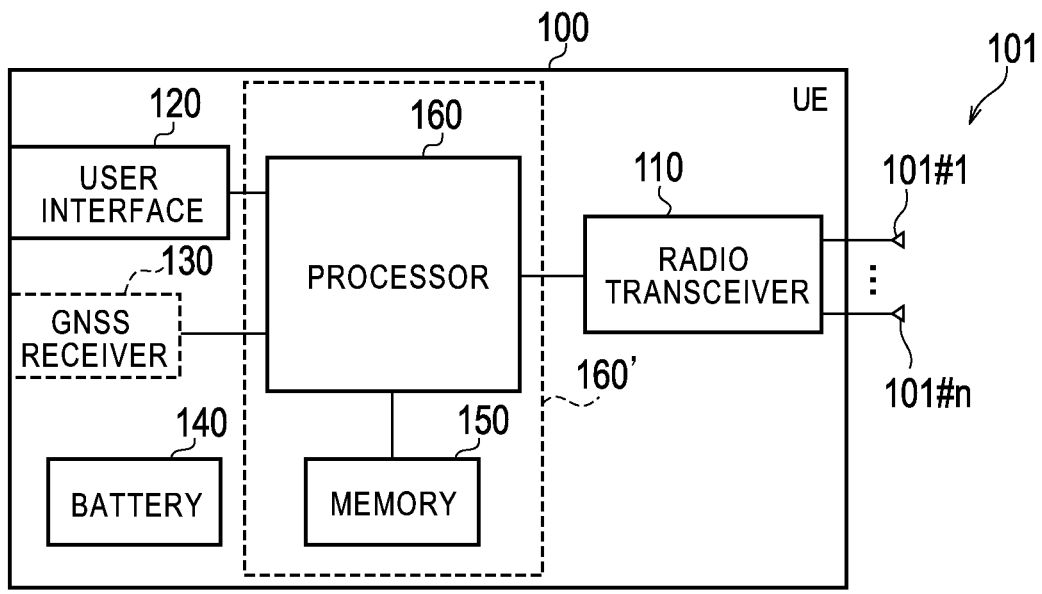
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. It is noted that the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
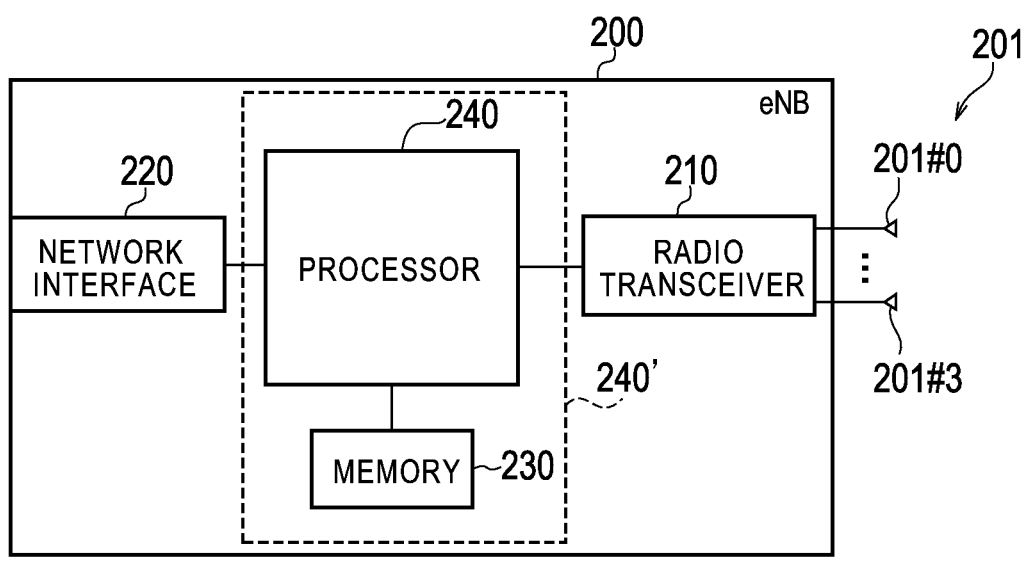
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. It is noted that the memory 230 may be integrally formed with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

(D2D Communication)

Next, a description is given with comparing the D2D communication with the normal communication (the cellular communication) in the LTE system.

Figure 4:
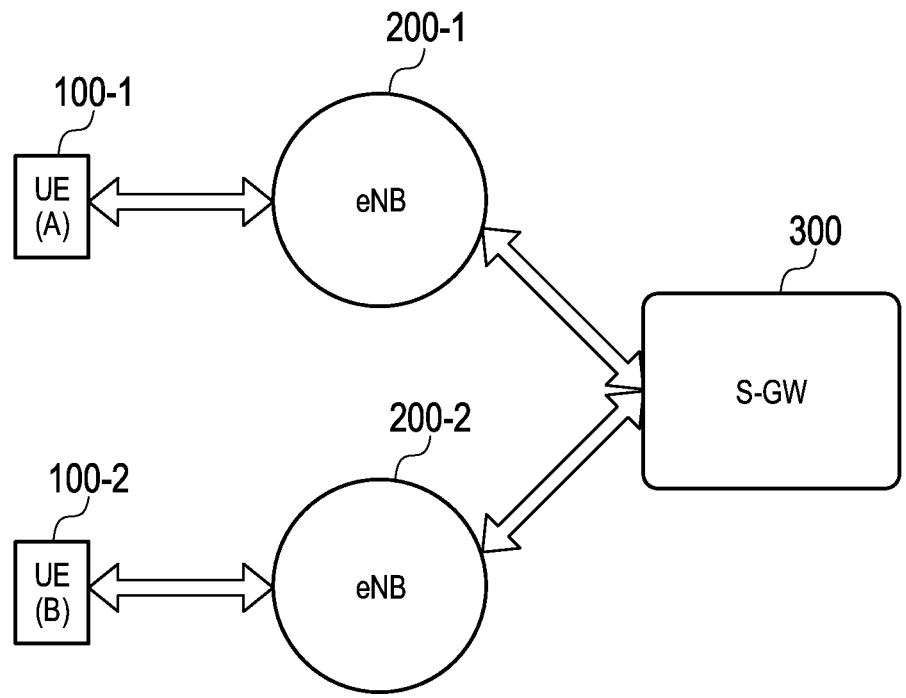
FIG. 4 is a diagram illustrating a data path in cellular communication.

FIG. 4 is a diagram illustrating a data path in the cellular communication. In this case, FIG. 4 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 4, the data path of the cellular communication goes through a network. Specifically, the data path is set to pass through the eNB 200-1, the S-GW 300, and the eNB 200-2.

Figure 5:
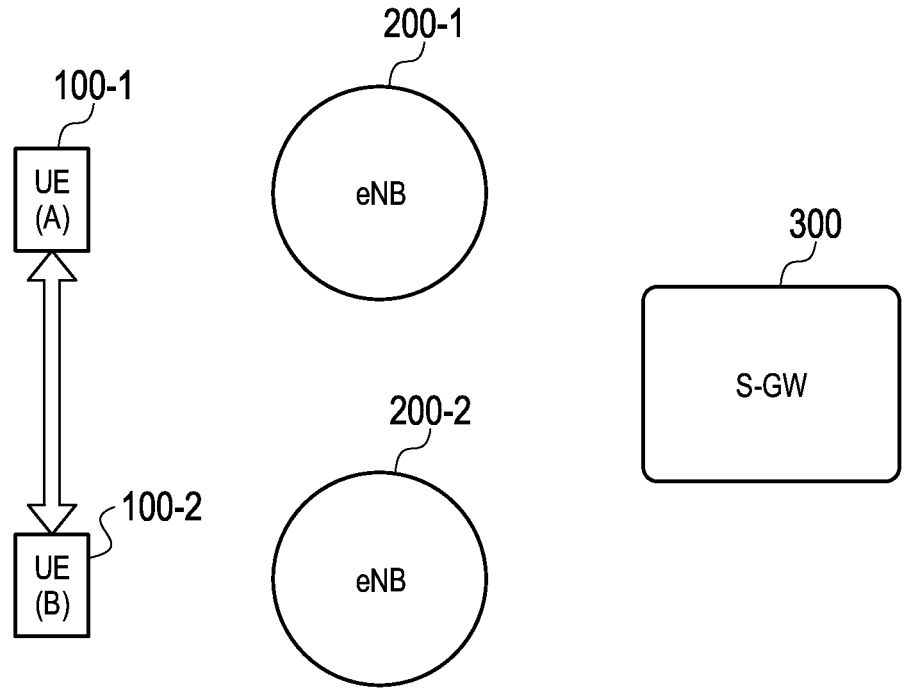
FIG. 5 is a diagram illustrating a data path in D2D communication.

FIG. 5 is a diagram illustrating a data path in the D2D communication. In this case, FIG. 5 illustrates the case in which the D2D communication is performed between the UE 100-1 that establishes a connection with the eNB 200-1 and the UE 100-2 that establishes a connection with the eNB 200-2.

As illustrated in FIG. 5, the data path of the D2D communication does not go through a network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. It is noted that, in a mode called Locally Routed, a data path goes through the eNB 200 without going through the S-GW 300.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

Specifically, the UE 100-1 transmits a discovery-use signal (Discover signal/Discoverable signal) for discovering the partner terminal or for being discovered by the partner terminal. The UE 100-2 having received the discovery-use signal discovers the UE 100-1. The UE 100-2 transmits a response to a discovery-use signal so that the UE 100-1 having transmitted discovery-use signal discovers the UE 100-1 being the partner terminal.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. Further, the UE 100-1 may report a vicinity UE 100 (that is, the UE 100-2) to an upper layer (such as an application) in a case where the UE 100-1 does not perform the D2D communication after discovering the partner terminal. For example, the application can perfume a process based on the report (such as a process in which a location of the UE 100-2 is plotted on map information)

Further, the UE 100 can report discovering the partner terminal to the eNB 200 and receive instruction for whether communication with the partner terminal is performed by the cellular communication or the D2D communication, from the eNB 200.

On the other hand, in the above-described case (b), for example, the UE 100-1 starts transmitting (announcing by broadcast or the like) a signal for the D2D communication without specifying the partner terminal. Thus, the UE 100 is capable of starting the D2D communication regardless of the existence of the discovery of a partner terminal. It is noted the UE 100-2 performing a waiting operation for receiving a signal for the D2D communication performs synchronization and/or demodulation on the basis of the signal from the UE 100-1.

(Operation of Mobile Communication System According to First Embodiment)

Next, by using FIG. 6 and FIG. 7, an operation of a mobile communication system according to the first embodiment will be described.

Figure 6A:
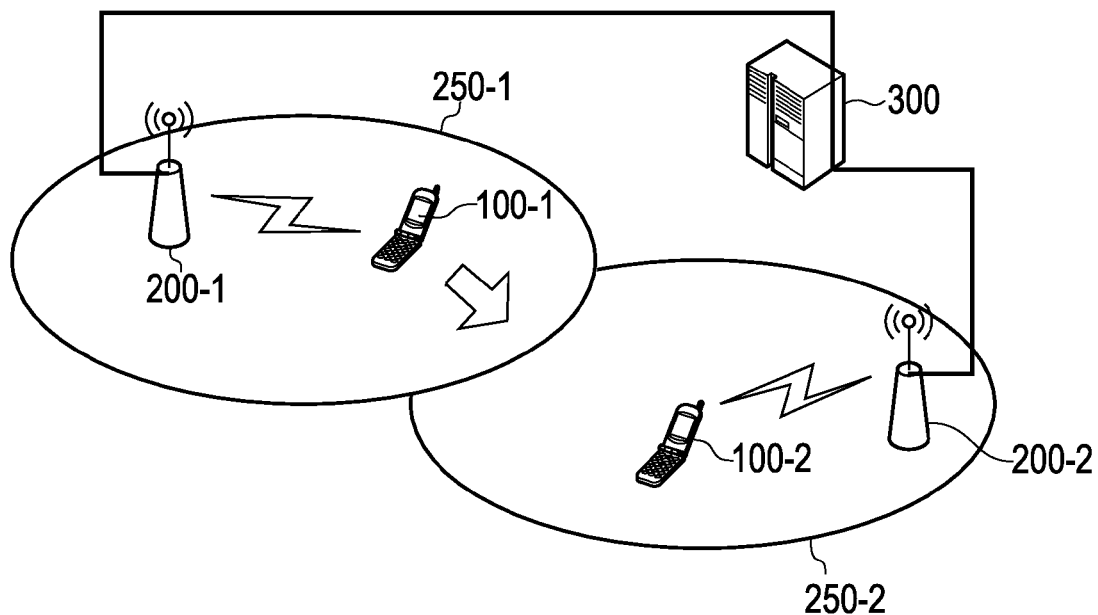
FIG. 6A and FIG. 6B are diagrams each illustrating an operation example of UE 100-1 and UE 100-2 according to a first embodiment.
Figure 6B:
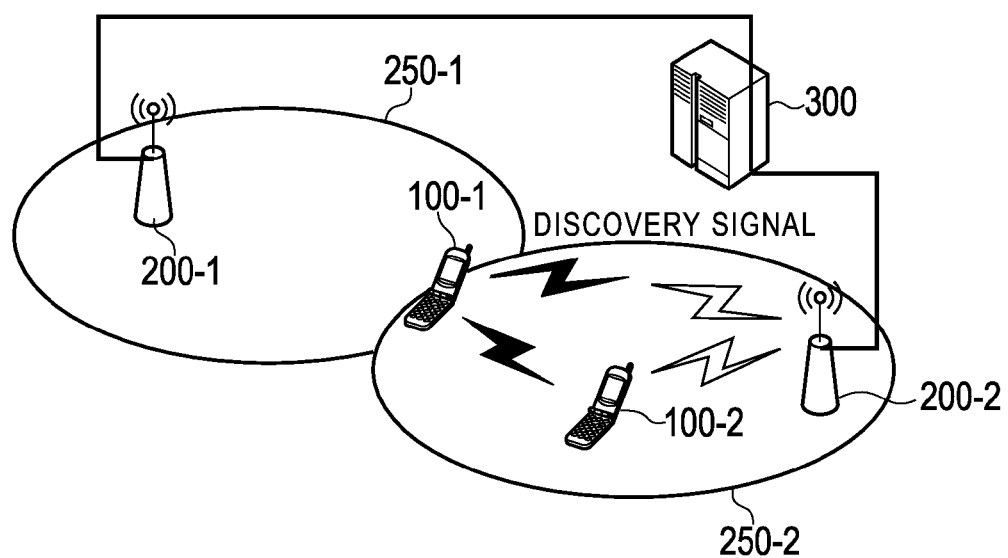

FIG. 6A and FIG. 6B are diagrams each illustrating an operation example of UE 100-1 and UE 100-2 according to the first embodiment. Specifically, FIG. 6A is a diagram illustrating a state before the UE 100-1 moves and FIG. 6B is a diagram illustrating a state after the UE 100-1 moves.

As illustrated in FIG. 6A, the UE 100-1 is connected to a cell 250-1 managed by the eNB 200-1. The UE 100-2 is connected to a cell 250-2 managed by the eNB 200-2. The eNB 200-1 and the eNB 200-2 are connected, via the S1 interface, to the MME/S-GW 300. The UE 100-1 and the UE 100-2 perform communication with each other (so-called cellular communication) via the eNB 200-1 and the eNB 200-2. It is noted that FIG. 6A and FIG. 6B illustrate an example in which the eNB 200-1 and the eNB 200-2 connect, via the S1 interface, with the MME/S-GW 300; however, an example in which the eNB 200-1 and the eNB 200-2 connect thereto via the X2 interface may be possible.

In the present embodiment, description is provided on the assumption that as illustrated in FIG. 6A, the UE 100-1 moves in a direction of the cell 250-2, and as illustrated in FIG. 6B, the UE 100-1 transmits a discovery-use signal (hereinafter, referred to as "Discovery signal") after executing a handover to the cell 250-2.

Herein, the eNB 200-1 has a neighbor cell list and a communication terminal list. That is, in the memory 230 of the eNB 200-1, the neighbor cell list and the communication terminal list are stored. Similarly, the eNB 200-2 includes the neighbor cell list and the communication terminal list.

FIG. 7A is a diagram illustrating an example of the neighbor cell list. FIG. 7B is a diagram illustrating an example of a communication terminal list.

The neighbor cell list is a list used by the eNB 200 to comprehend a neighbor cell adjacent to a cell managed by the eNB 200 (hereinafter, referred to as "self-cell", where necessary). On the neighbor cell list, information (neighbor cell ID) indicating a neighbor cell adjacent to the self-cell is recorded. For example, as illustrated in FIG. 7A, on the neighbor cell list (left side in FIG. 7A) provided in the eNB 200-1, the cell 250-2 is recorded as a neighbor cell adjacent to the cell 250-1, that is, the self-cell. On the neighbor cell list (right side in FIG. 7A) provided in the eNB 200-2, the cell 250-1 is recorded as a neighbor cell adjacent to the self-cell 250-2.

The communication terminal list is a list used by the eNB 200 to comprehend the UE 100 connected to the self-cell, when the UE 100 connected to the self-cell communicates, via the eNB 200, with another UE 100. On the communication terminal list, information (communication UE ID) indicating the UE 100 connected to the self-cell and during communication, information (communication partner UE ID) indicating a communication partner UE 100 that is a communication partner of the UE 100 during communication, and information (communication partner connection cell ID) indicating a cell to which the communication partner UE 100 is connected are recorded. For example, as illustrated in FIG. 7B, on the communication terminal list (upper side in FIG. 7B) provided in the eNB 200-1, the UE 100-1 is recorded as the UE 100 connected to the self-cell (cell 250-1) and during communication, the UE 100-2 is recorded as the communication partner UE 100 of the UE 100 (UE 100-1) during communication, and the cell 250-2 is recorded as the cell to which the communication partner UE 100 (UE 100-2) is connected. On the communication terminal list (lower side in FIG. 7B) provided in the eNB 200-2, the UE 100-2 is recorded as the UE 100 connected to the self-cell (cell 250-2) and during communication, the UE 100-1 is recorded as the communication partner UE 100 of the UE 100 (UE100-2) during communication, and the cell 250-1 is recorded as the cell to which the communication partner UE (UE 100-1) is connected.

It is noted that information indicating all the UEs 100 connected to the self-cell and during communication may not necessarily be recorded on the communication terminal list. For example, on the communication terminal list, information of the UE 100 during communication when the connection cell of the communication partner UE 100 is the neighbor cell and information corresponding thereto (the communication partner UE ID and the communication partner connection cell ID) only may be recorded. That is, when the communication partner of the UE 100 connected to the self-cell is not connected to the neighbor cell, even the UE 100 connected to the self-cell and during communication may not be recorded on the communication terminal list.

The eNB 200 may inquire the MME, that is an upper device, or may inquire the UE 100 connected to the self-cell, when the communication partner UE 100 of the UE 100 connected to the self-cell is not recognized (when the communication partner UE is not known). Further, the eNB 200 may inquire the MME, that is an upper device, when the cell connected by the communication partner UE 100 of the UE 100 connected to the self-cell is not recognized (when a cell connected by the communication partner UE 100 of the UE 100 connected to the self-cell is not known).

When the communication of the UE 100-1 is ended, information on the UE 100-1 that ended the communication is deleted from a communication management list.

Next, a specific operation of the mobile communication system according to the first embodiment will be described. FIG. 8 is a sequence diagram illustrating an operation example of the mobile communication system according to the first embodiment.

As illustrated in FIG. 8, in step 101, the eNB 200-1 and the eNB 200-2 exchange the communication terminal information via the X2 interface or the S1 interface. Specifically, the eNB 200-1 transmits the communication terminal information based on the information recorded on the communication terminal list of the eNB 200-1, to the eNB 200-2 that manages the neighbor cell 250-2 recorded on the neighbor cell list of the eNB 200-1. Similarly, the eNB 200-2 transmits the communication terminal information based on the information recorded on the communication terminal list of the eNB 200-2, to the eNB 200-1 that manages the neighbor cell 250-1 recorded on the neighbor cell list of the eNB 200-2.

Herein, the communication terminal information is information indicating the UE 100 connected to the self-cell and during cellular communication, and a cell connected by the UE 100. The eNB 200 may transmit, as the communication terminal information, information indicating another UE 100 that is a communication partner of the UE 100 connected to the self-cell and information indicating the connection cell of the other UE 100 as well.

The eNB 200-1 and the eNB 200-2 update a communication terminal list provided in each of the eNB 200-1 and the eNB 200-2, on the basis of the received communication terminal information.

In step 102, the eNB 200-1 transmits Discovery related information to the UE 100-1. The UE 100-1 receives the Discovery related information.

Herein, the Discovery related information is information including the information of a radio resource used when the Discovery signal is transmitted and/or the information of the transmission power. The information of the radio resource used when the Discovery signal is transmitted includes at least one item of information of a time resource and information of a frequency resource. It is noted that the eNB 200-1 selects the radio resource and the transmission power that the Discovery signal will not act as an interference signal to the UE 100 connected to the cell 250-1 or/and the cell 250-2, and includes the same in the Discovery related information.

In the present embodiment, the eNB 200-1 transmits the Discovery related information by broadcast. For example, the eNB 200-1 transmits the Discovery related information by including the same into a system information block (SIB). When the Discovery related information is included in the system information block (SIB), the UE 100-1 is capable of receiving the Discovery related information even in an idle state. It is noted that the eNB 200-1 may transmit the Discovery related information by unicast.

In step 103, the eNB 200-1 transmits the cell identification information to the UE 100-1.

Herein, the cell identification information is information indicating the connection cell connected by the UE 100-2 during communication with the UE 100-1. In the present embodiment, the cell identification information transmitted by the eNB 200-1 includes an identifier indicating the cell 250-2 connected by the UE 100-2 (see a column of "communication partner connection cell ID" in FIG. 7B).

The eNB 200-1 may periodically transmit the cell identification information to the UE 100-1. For example, the eNB 200-1 may transmit the cell identification information when a predetermined time elapses after the UE 100-1 started communication with the UE 100-2, and may transmit the cell identification information when it is recorded or updated on the basis of the communication terminal information that the connection cell of the UE 100-2 is the cell 250-2.

In step 104, the UE 100-1 that moved in the direction of the cell 250-2 executes a handover for connecting with the cell 250-2. As a result, the UE 100-1 performs communication with the UE 100-2 via the eNB 200-2.

In step 105, the UE 100-1 determines whether or not the UE 100-1 and the UE 100-2 exist in the vicinity. In the present embodiment, the UE 100-1 determines whether or not the UE 100-1 and the UE 100-2 exist in the vicinity, triggered by the execution of the handover. The UE 100-1 determines that the UE 100-1 and the UE 100-2 exist in the vicinity when having executed a handover to the connection cell of the UE 100-2, and decides to transmit the Discovery signal.

Specifically, the UE 100-1 determines that the UE 100-1 and the UE 100-2 exist in the vicinity when the connection cell of the UE 100-1 and the connection cell of the UE 100-2 are the same. That is, the UE 100-1 determines whether or not the cell (that is, the connection cell of the UE 100-2) indicated by the cell identification information received in step 103 and the connection cell of the UE 100-1 are the same.

It is noted that when the UE 100-1 does not get the cell identification information from the eNB 200-1, the UE 100-1 determines that the connection cell of the UE 100-1 and the connection cell of the UE 100-2 are not the same.

When it is determined that the UE 100-1 and the UE 100-2 do not exist in the vicinity ("No" in step 105), the UE 100-1 does not transmit the Discovery signal.

On the other hand, the UE 100-1 executes a process in step 106 when it is determined that the UE 100-1 and the UE 100-2 exist in the vicinity ("Yes" in step 105).

In step 106, the UE 100-1 starts transmitting the Discovery signal.

The UE 100-1 may transmit the Discovery signal corresponding to the Discovery related information when the Discovery related information has been received. Specifically, the UE 100-1 decides the radio resource and the transmission power used when the Discovery signal is transmitted on the basis of the information of the radio resource and/or the information of the transmission power included in the Discovery related information. The UE 100-1 starts transmitting the Discovery signal on the basis of the decided radio resource and transmission power.

The UE 100-1 may transmit the Discovery signal predetermined number of times, or may transmit the same during a predetermined period. The eNB 200-1 may include the information indicating the predetermined number of times and the predetermined period into the Discovery related information, and transmit the same by broadcast or by unicast.

The UE 100-1 may suspend transmitting the Discovery signal when a response signal to the Discovery signal (hereinafter, referred to as "Discovery response signal") is not received from the UE 100-2, within the predetermined number of times or the predetermined period. As a result, it is possible to restrain consumption of a battery of the UE 100-1.

In the Discovery signal, identification information indicating that a transmission source of the Discovery signal is the UE 100-1 and/or identification information indicating that a transmission target of the Discovery signal is the UE 100-2 may be included.

The UE 100-2 transmits the Discovery response signal to the UE 100-1 when the Discovery signal is received. The UE 100-1 requests the eNB 200-2 to connect with the UE 100-2 by D2D communication when the Discovery response signal is received.

The eNB 200-2 that received the request performs scheduling. Specifically, a radio resource used for communication (the D2D communication) between the UE 100-1 and the UE 100-2 is assigned, and scheduling information is transmitted to the UE 100-1. The scheduling information includes information indicating a radio resource assigned to the D2D communication between the UE 100-1 and the UE 100-2.

The UE 100-1 and the UE 100-2 perform exchange (negotiation) of information used to establish a D2D link. Information that is used to establish the D2D link, for example, is the scheduling information.

When the D2D link is established between the UE 100-1 and the UE 100-2, the UE 100-1 reports to the eNB 200-2 that the D2D link is established.

The eNB 200-2 that has been reported ends the communication, via the eNB 200-2, between the UE 100-1 and the UE 100-2.

First Modification of First Embodiment

Next, by using FIG. 9, an operation of a mobile communication system according to a first modification of the first embodiment will be described. It is noted that description will be provided while focusing a portion different from the above-described first embodiment, and description of a similar portion will be omitted, where necessary.

In the above-described first embodiment, it is determined whether or not the UE 100-1 and the UE 100-2 exist in the vicinity, after the UE 100-1 executes the handover. In the present modification, whether or not the UE 100-1 and the UE 100-2 exist in the vicinity is determined irrespective of the UE 100-1 executing the handover.

Figure 9:
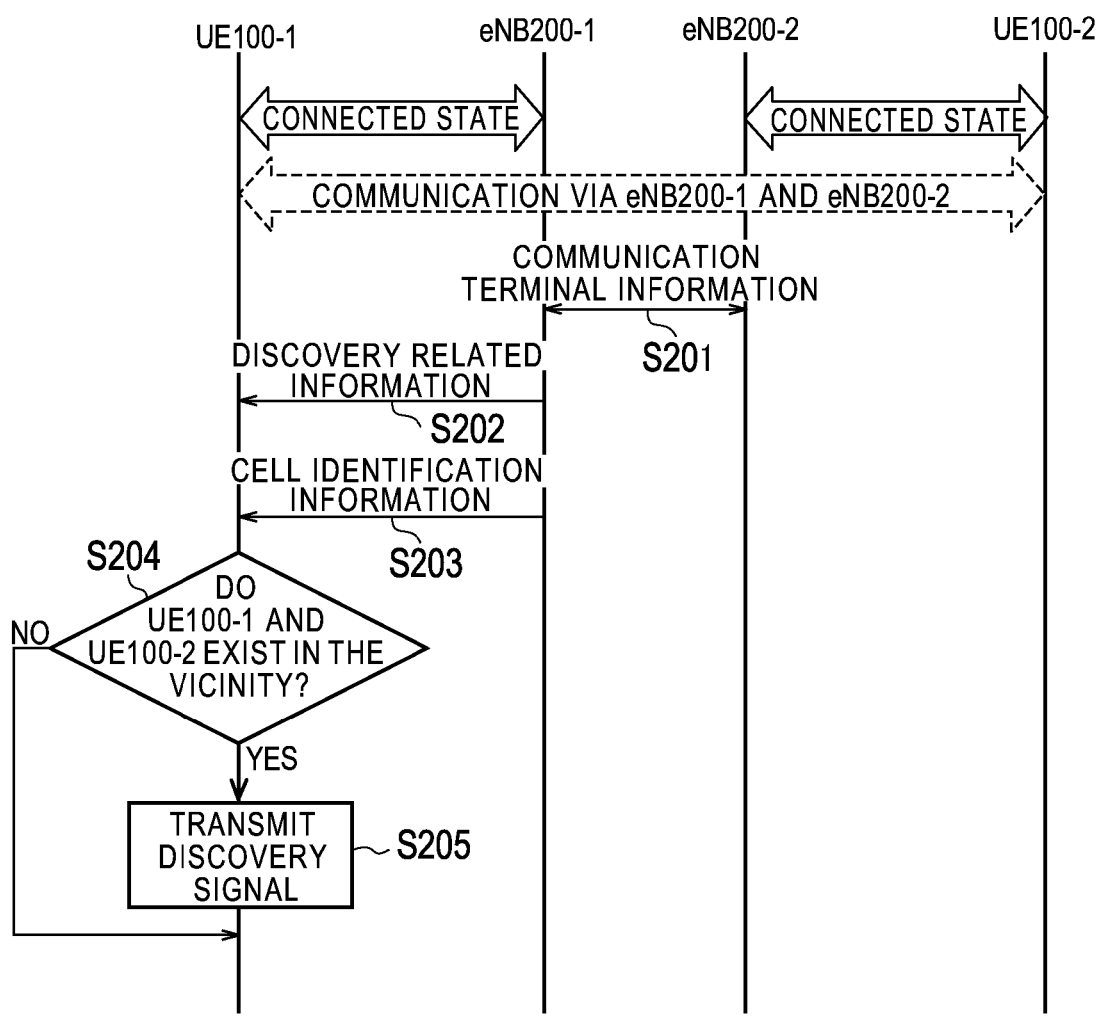
FIG. 9 is a sequence diagram illustrating an operation example of a mobile communication system according to a first modification of the first embodiment.

FIG. 9 is a sequence diagram illustrating an operation example of the mobile communication system according to the first modification of the first embodiment.

In FIG. 9, step 201 to step 203 correspond to step 101 to step 103 in the first embodiment, respectively (see FIG. 8).

As illustrated in FIG. 9, in step 204, the UE 100-1 determines whether or not the UE 100-1 and the UE 100-2 exist in the vicinity. In the present embodiment, the UE 100-1 determines that the UE 100-1 and the UE 100-2 exist in the vicinity when a reception level of a reference signal (for example, RSRP) transmitted from the cell 250-2 reaches a predetermined threshold value.

Herein, the predetermined threshold value is a threshold value that acts as a trigger (trigger of Measurement Report) for reporting a measurement value relating to the reception level of the reference signal transmitted from the cell 250-2, to the eNB 200-1, for example. For example, when, after the UE 100-1 executes a handover to the cell 250-2, the reception level of the reference signal transmitted from the cell 250-2 becomes higher than a predetermined threshold value (event A1), the UE 100-1 determines that the UE 100-1 and the UE 100-2 exist in the vicinity. Alternatively, in any of the cases of: when a reception level of a reference signal (hereinafter, referred to as "second reference signal") transmitted from the cell 250-2 connected by the UE 100-2 becomes higher than a predetermined threshold value obtained by offsetting the reception level of a reference signal (hereinafter, referred to as "first reference signal") transmitted from the cell 250-1 connected by the UE 100-1 (event A3); when the reception level of the second reference signal becomes lower than a predetermined threshold value (event A4); or when the reception level of the first reference signal becomes lower than a predetermined first threshold value and the reception level of the second reference signal becomes lower than a predetermined second threshold value (event A5), the UE 100-1 may determine that the UE 100-1 and the UE 100-2 exist in the vicinity.

Further, a predetermined threshold value may be a threshold value designated by the eNB 200-1. The eNB 200-1 transmits information indicating the designated threshold value by broadcast or by unicast. It is noted that the eNB 200-1 may include the designated threshold value into the system information block (SIB) and transmit the same, when transmitting by broadcast. Further, the eNB 200-1 may include the information indicating the designated threshold value into the Discovery related information and transmit the same.

When it is determined that the UE 100-1 and the UE 100-2 do not exist in the vicinity ("No" in step 204), the UE 100-1 does not transmit the Discovery signal.

On the other hand, the UE 100-1 executes a process in step 205 when it is determined that the UE 100-1 and the UE 100-2 exist in the vicinity ("Yes" in step 204). Step 205 corresponds to step 106 in the first embodiment (see FIG. 8).

Second Modification of First Embodiment

Next, by using FIG. 10, an operation of a mobile communication system according to a second modification of the first embodiment will be described. It is noted that description will be provided while focusing a portion different from the above-described first embodiment and modification, and description of a similar portion will be omitted, where necessary.

In the above-described first embodiment, the UE 100-1 receives the Discovery related information from the eNB 200-1 before executing the handover. In the present modification, the UE 100-1 receives the Discovery related information from the eNB 200-2 after executing the handover.

Figure 10:
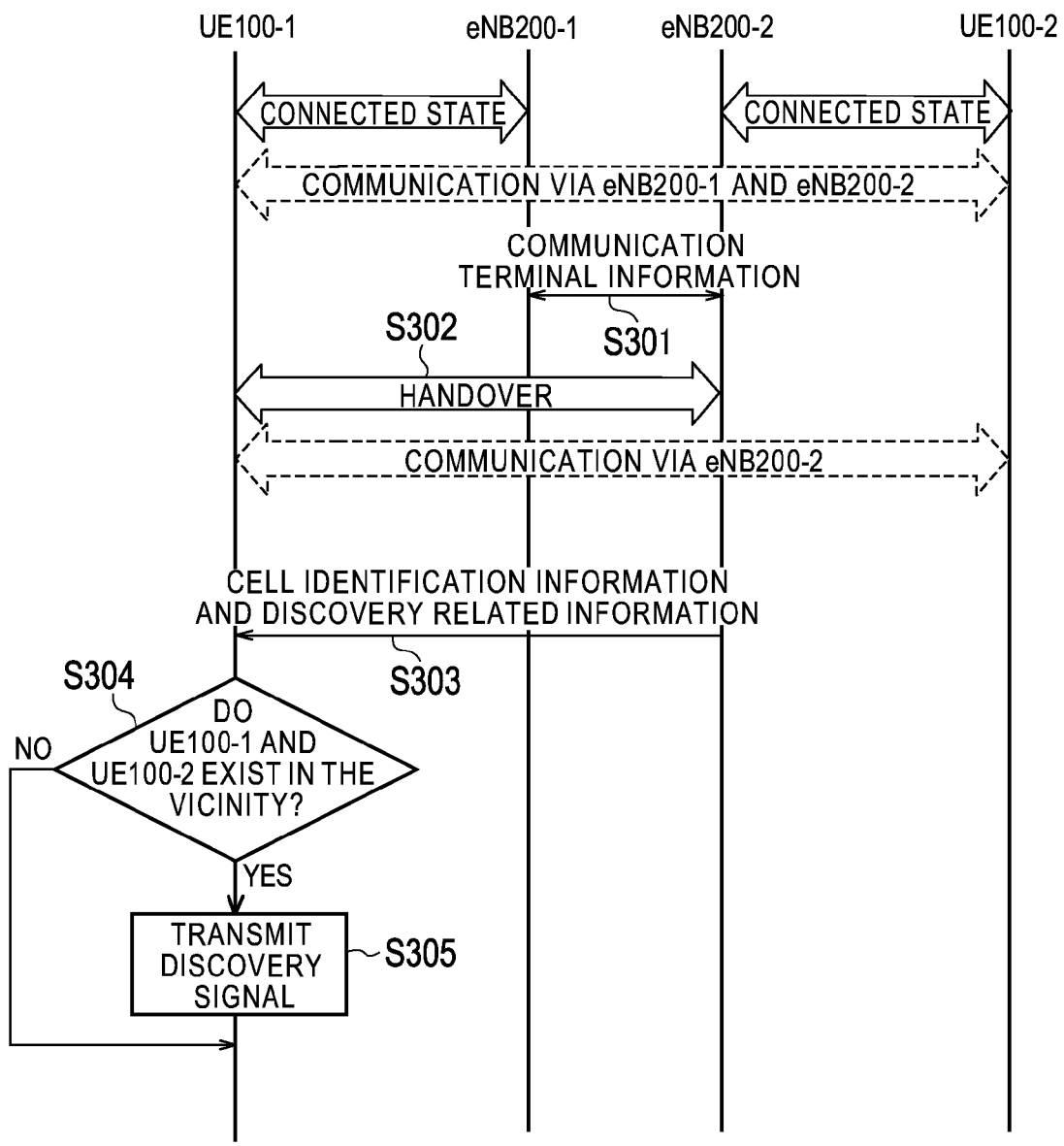
FIG. 10 is a sequence diagram illustrating an operation example of a mobile communication system according to a second modification of the first embodiment.

FIG. 10 is a sequence diagram illustrating an operation example of the mobile communication system according to the second modification of the first embodiment.

In FIG. 10, step 301 and step 302 correspond to step 101 and step 104 in the first embodiment, respectively (see FIG. 8).

The eNB 200-2 records, on the communication terminal list, that the UE 100-1 changed the connection cell to the cell 250-2 as a result of the UE 100-1 having executed handover to the cell 250-2 managed by the eNB 200-2, and updates the communication terminal list.

As illustrated in FIG. 10, in step 303, the eNB 200-2 transmits the Discovery related information, together with the cell identification information, to the UE 100-1 by unicast.

In the present modification, the eNB 200-2 transmits the cell identification information and the Discovery related information to the UE 100-1 by unicast, triggered by the handover, by the UE 100-1, to the cell 250-2 managed by the eNB 200-2. That is, the eNB 200-2 transmits the cell identification information and the Discovery related information when the UE 100-1 executed the handover to the cell 250-2.

It is noted that the eNB 200-2 may transmit the cell identification information and the Discovery related information, separately.

Step 304 and step 305 correspond to step 105 and step 106 in the first embodiment, respectively (see FIG. 8).

Third Modification of First Embodiment

Next, by using FIG. 11, an operation of a mobile communication system according to a third modification of the first embodiment will be described. It is noted that description will be provided while focusing a portion different from the above-described first embodiment and each modification, and description of a similar portion will be omitted, where necessary.

In the above-described first embodiment, the eNB 200-1 (or the eNB 200-2) transmits, of its own accord, the Discovery related information to the UE 100-1. In the present modification, the eNB 200-2 transmits the Discovery related information when there is a request of the Discovery related information from the UE 100-1.

FIG. 11 is a sequence diagram illustrating an operation example of the mobile communication system according to the third modification of the first embodiment.

In FIG. 11, step 401 and step 402 correspond to step 101 and step 104 in the first embodiment, respectively (see FIG. 8).

As illustrated in FIG. 11, in step 403, the eNB 200-2 transmits the cell identification information to the UE 100-1.

In step 404, the UE 100-1 determines whether or not the UE 100-1 and the UE 100-2 exist in the vicinity.

When it is determined that the UE 100-1 and the UE 100-2 do not exist in the vicinity ("No" in step 404), the UE 100-1 does not transmit the Discovery signal.

On the other hand, the UE 100-1 executes a process in step 405 when it is determined that the UE 100-1 and the UE 100-2 exist in the vicinity ("Yes" in step 404).

In step 405, the UE 100-1 requests the eNB 200-2 to transmit the Discovery related information. The eNB 200-2 receives the request of the Discovery related information.

In step 406, the eNB 200-2 that received the request of the Discovery related information transmits the Discovery related information to the UE 100-1. The UE 100-1 receives the Discovery related information.

In step 407, the UE 100-1 transmits the Discovery signal corresponding to the Discovery related information.

Summary of First Embodiment

In the present embodiment, the UE 100-1 starts transmitting the Discovery signal when it is determined that the UE 100-1 and the UE 100-2 exist in the vicinity while the UE 100-1 is communicating with the UE 100-2. When it is thereby determined that the UE 100-1 and the UE 100-2 exist in the vicinity, the UE 100-2 is highly likely to receive the Discovery signal transmitted from the UE 100-1. Therefore, the UE 100-1 is capable of transmitting the Discovery signal at an appropriate timing without a need of transmitting a wasteful Discovery signal.

In addition, the UE 100-1 does not need to transmit a wasteful Discovery signal, and thus, it is possible to restrain a consumption of a battery of the UE 100-1.

Further, in the present embodiment, the eNB 200-1 transmits the cell identification information indicating the connection cell connected by the UE 100-2, to the UE 100-1, and the UE 100-1 determines on the basis of the cell identification information whether or not the UE 100-1 and the UE 100-2 exist in the vicinity. As a result, the UE 100-1 makes its own determination on the basis of the cell identification information, and thus, the UE 100-1 is capable of transmitting the Discovery signal at an appropriate timing.

Further, in the present embodiment, the UE 100-1 determines that the UE 100-1 and the UE 100-2 exist in the vicinity when having executed a handover to the connection cell of the UE 100-2. As a result, the UE 100-1 and the UE 100-2 exist in the identical cell, and thus, the UE 100-2 is highly likely to exist in the vicinity of the UE 100-1. Therefore, it is highly likely that the UE 100-2 receives the Discovery signal transmitted from the UE 100-1, and the UE 100-1 is capable of transmitting the Discovery signal at an appropriate timing.

Further, in the present embodiment, the eNB 200-1 transmits the Discovery related information including the information of the radio resource used when the Discovery signal is transmitted and/or the information of the transmission power, to the UE 100-1, and the UE 100-1 transmits the Discovery signal corresponding to the Discovery related information. As a result, it is possible to restrain the Discovery signal from becoming an interference signal to another UE 100 existing in the vicinity of the UE 100-1.

In the present first modification, the UE 100-1 determines that the UE 100-1 and the UE 100-2 exist in the vicinity when a reception level of a reference signal transmitted from the eNB 200-2 (cell 250-2) reaches a predetermined threshold value. As a result, the UE 100-1 is capable of transmitting the Discovery signal when it is possible to determine that the UE 100-1 exists in the cell 250-2 connected by the UE 100-2 even when a handover is not executed (for example, when a handover request from the UE 100-1 is not received by the eNB 200-2), and thus, the UE 100-1 is capable of transmitting the Discovery signal at an appropriate timing.

Further, in the present first modification, the predetermined threshold value is a threshold value that acts as a trigger for reporting a measurement value relating to the reception level of the reference signal from the cell 250-2 to the eNB 200-1. The trigger for report the measurement value is utilized as a criteria to execute a handover, and thus, the UE 100-1 is highly likely to exist in the cell 250-2 and the UE 100-1 and the UE 100-2 are highly likely to exist in the identical cell. Therefore, the UE 100-1 is capable of transmitting the Discovery signal at an appropriate timing.

In the present first modification, the predetermined threshold value is a threshold value designated by the eNB 200-1. As a result, the eNB 200-1 is capable of controlling a transmission timing of the Discovery signal.

In the present second modification, the eNB 200-2 transmits the Discovery related information to the UE 100-1 when the UE 100-1 executed the handover to the cell 250-2. As a result, the UE 100-1 that executed a handover to the cell 250-2 receives the Discovery related information from the eNB 200-2 that manages the cell 250-2, and thus, it is possible to receive the Discovery related information more surely than a case where the Discovery related information is received from the eNB 200-1.

In the present second modification, the eNB 200-2 transmits the Discovery related information, together with the cell identification information. As a result, the UE 100-1 is capable of starting transmitting the Discovery signal by using the Discovery related information transmitted together with the cell identification information, when it is determined on the basis of the received cell identification information that the UE 100-2 exists in the vicinity.

In the third modification, the eNB 200-2 transmits the Discovery related information when there is a request of the Discovery related information from the UE 100-1. As a result, the eNB 200-2 may transmit the Discovery related information only when it is necessary, and thus, it is possible to reduce a load of the eNB 200-2.

Second Embodiment

Operation of Mobile Communication System According to Second Embodiment

Next, by using FIG. 12 and FIG. 13, an operation of a mobile communication system according to a second embodiment will be described. It is noted that description will be provided while focusing a portion different from the above-described first embodiment and each modification, and description of a similar portion will be omitted, where necessary.

Figure 12A:
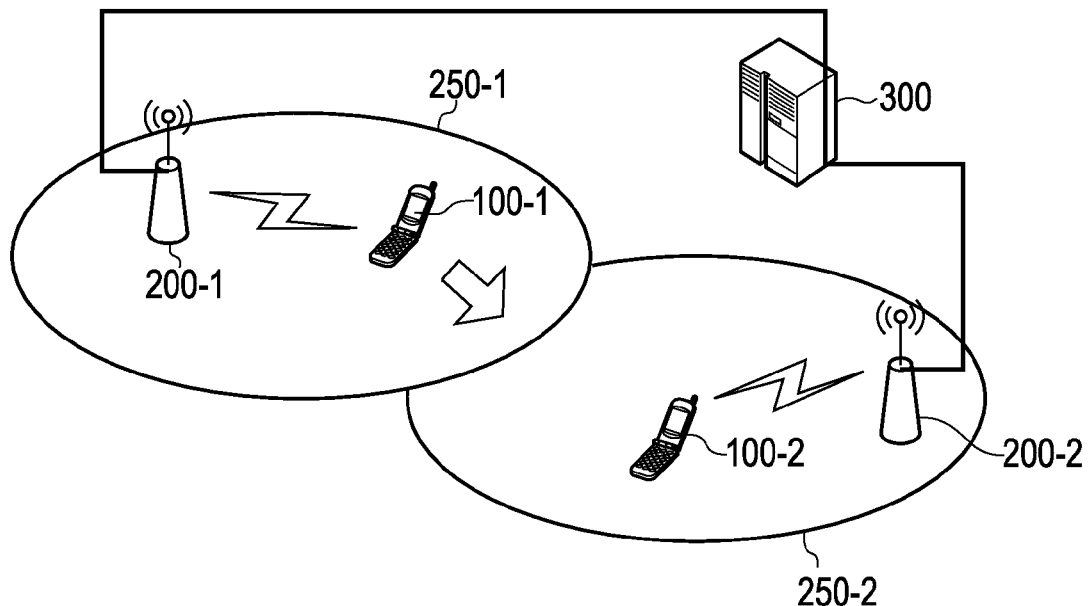
FIG. 12A and FIG. 12B are diagrams each illustrating an operation example of UE 100-1 and UE 100-2 according to a second embodiment.
Figure 12B:
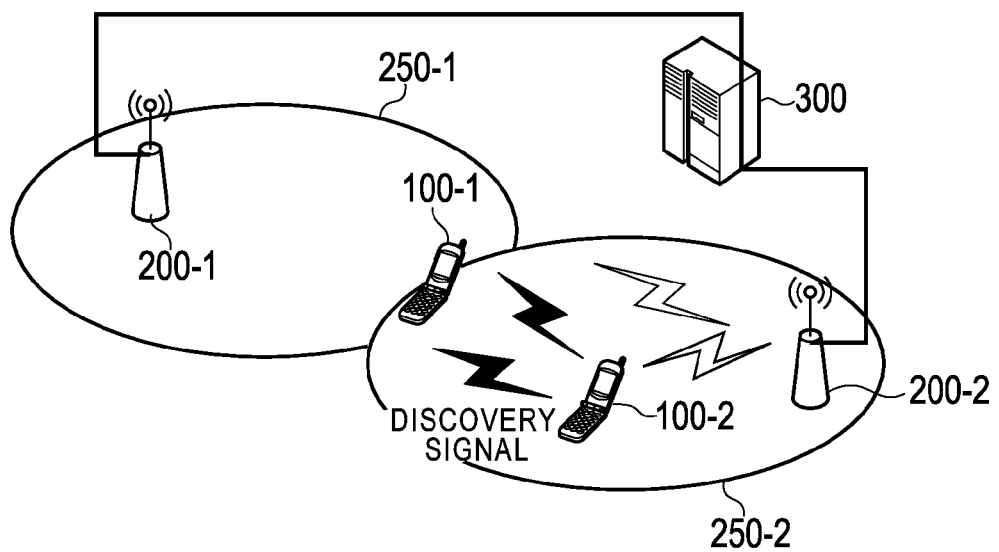

FIG. 12A and FIG. 12B are diagrams each illustrating an operation example of the UE 100-1 and the UE 100-2 according to the second embodiment. Specifically, FIG. 12A is a diagram illustrating a state before the UE 100-1 moves and FIG. 12B is a diagram illustrating a state after the UE 100-1 moves.

As illustrated in FIG. 12A, the UE 100-1 and the UE 100-2 perform communication (so-called cellular communication) via the eNB 200-1 and the eNB 200-2, similarly to the first embodiment.

In the present embodiment, description is provided on the assumption that, as illustrated in FIG. 12A, after the UE 100-1 that moved in a direction of the cell 250-2 executed a handover to the cell 250-2, as illustrated in FIG. 12A and FIG. 12B, the UE 100-2 connected to the cell 250-2 transmitted a Discovery signal to the UE 100-1.

FIG. 13 is a sequence diagram illustrating an operation example of the mobile communication system according to the second embodiment.

In FIG. 13, step 501 corresponds to step 101 in the first embodiment (see FIG. 8).

As illustrated in FIG. 13, in step 502, the eNB 200-2 transmits the cell identification information to the UE 100-2.

In step 503, the eNB 200-2 transmits Discovery related information to the UE 100-2. The UE 100-2 receives the Discovery related information.

Step 504 corresponds to step 104 in the first embodiment (see FIG. 8).

In step 505, the eNB 200-1 and the eNB 200-2 exchange the communication terminal information, triggered by the UE 100-1 executing a handover. The eNB 200-1 and the eNB 200-2 update a communication terminal list provided in each of the eNB 200-1 and the eNB 200-2, on the basis of the received communication terminal information.

In step 506, the eNB 200-2 transmits the cell identification information to the UE 100-2. The eNB 200-2 transmits the cell identification information to the UE 100-1 when the UE 100-1 executed the handover. That is, the eNB 200-2 transmits the cell identification information to the UE 100-2 when a connection target of the UE 100-1 that is the communication partner of the UE 100-2 was changed.

In step 507, the UE 100-2 determines whether or not the UE 100-1 and the UE 100-2 exist in the vicinity. This determination is the same as in step 105 in the first embodiment (see FIG. 8).

When it is determined that the UE 100-1 and the UE 100-2 do not exist in the vicinity ("No" in step 507), the UE 100-2 does not transmit the Discovery signal.

On the other hand, when it is determined that the UE 100-1 and the UE 100-2 exist in the vicinity ("Yes" in step 105), in step 508, the UE 100-2 starts transmitting the Discovery signal.

Modification of Second Embodiment

Next, by using FIG. 14, an operation of a mobile communication system according to a modification of the second embodiment will be described. It is noted that description will be provided while focusing a portion different from the above-described first and second embodiments and each modification, and description of a similar portion will be omitted, where necessary.

In the above-described second embodiment, the eNB 200-2 transmits the cell identification information to the UE 100-2. In the present modification, the eNB 200-2 transmits, besides the cell identification information, information indicating that the UE 100-1 that is the communication partner executed the handover, to the UE 100-2.

FIG. 14 is a sequence diagram illustrating an operation example of the mobile communication system according to the modification of the second embodiment.

In FIG. 14, step 601, 602, and 603 correspond to step 501, 502, and 504 in the second embodiment, respectively (see FIG. 13).

As illustrated in FIG. 14, in step 604, the eNB 200-2 transmits the partner terminal HO information and the Discovery related information, to the UE 100-2. The UE 100-2 receives the partner terminal HO information and the Discovery related information.

Herein, the partner terminal HO information is information indicating that the UE 100-1 that is the communication partner of the UE 100-2 executed the handover.

The UE 100-2 that received the partner terminal HO information is capable of recognizing that the UE 100-1 is not connected to the cell 250-1, and thus, even if the UE 100-2 moves to the cell 250-1, it may not need to start transmitting the Discovery signal.

It is noted that the eNB 200-2 may transmit the partner terminal HO information and the Discovery related information, separately.

Step 605 to step 607 correspond to step 506 to step 508 in the second embodiment, respectively (see FIG. 13).

Summary of Second Embodiment

In the present embodiment, the eNB 200-2 transmits the cell identification information to the UE 100-2 when the UE 100-1 executed the handover. As a result, the UE 100-2 is capable of determining that a connection target of the UE 100-1 was changed, and thus, it is possible to avoid a situation of making an erroneous determination that the UE 100-2 and the UE 100-1 exist in the vicinity on the basis of the cell identification information got before the UE 100-1 executes a handover. Therefore, the UE 100-2 is capable of eliminating a need of transmitting a wasteful Discovery signal, and the UE 100-2 is capable of transmitting the Discovery signal at an appropriate timing.

In the present modification, the eNB 200-2 transmits the partner terminal HO information to the UE 100-2 when the UE 100-1 executed the handover. As a result, similarly to the above-described second embodiment, the UE 100-2 will not make an erroneous determination that the UE 100-1 and the UE 100-2 exist in the vicinity.

Third Embodiment

Operation of Mobile Communication System According to Third Embodiment

Next, by using FIG. 15, an operation of a mobile communication system according to a third embodiment will be described. It is noted that description will be provided while focusing a portion different from the above-described first and second embodiments and each modification, and description of a similar portion will be omitted, where necessary.

In the first and second embodiments, the UE 100-1 or the UE 100-2 determines whether or not the UE 100-1 and the UE 100-2 exist in the vicinity. In the present embodiment, the eNB 200-2 determines whether or not the UE 100-1 and the UE 100-2 exist in the vicinity.

In the present embodiment, similarly to the second embodiment, description is provided on the assumption that the UE 100-1 moved in a direction of the cell 250-2, and executed a handover to the eNB 200-2, and then, the UE 100-2 transmitted a Discovery signal (see FIG. 12A and FIG. 12B).

Figure 15:
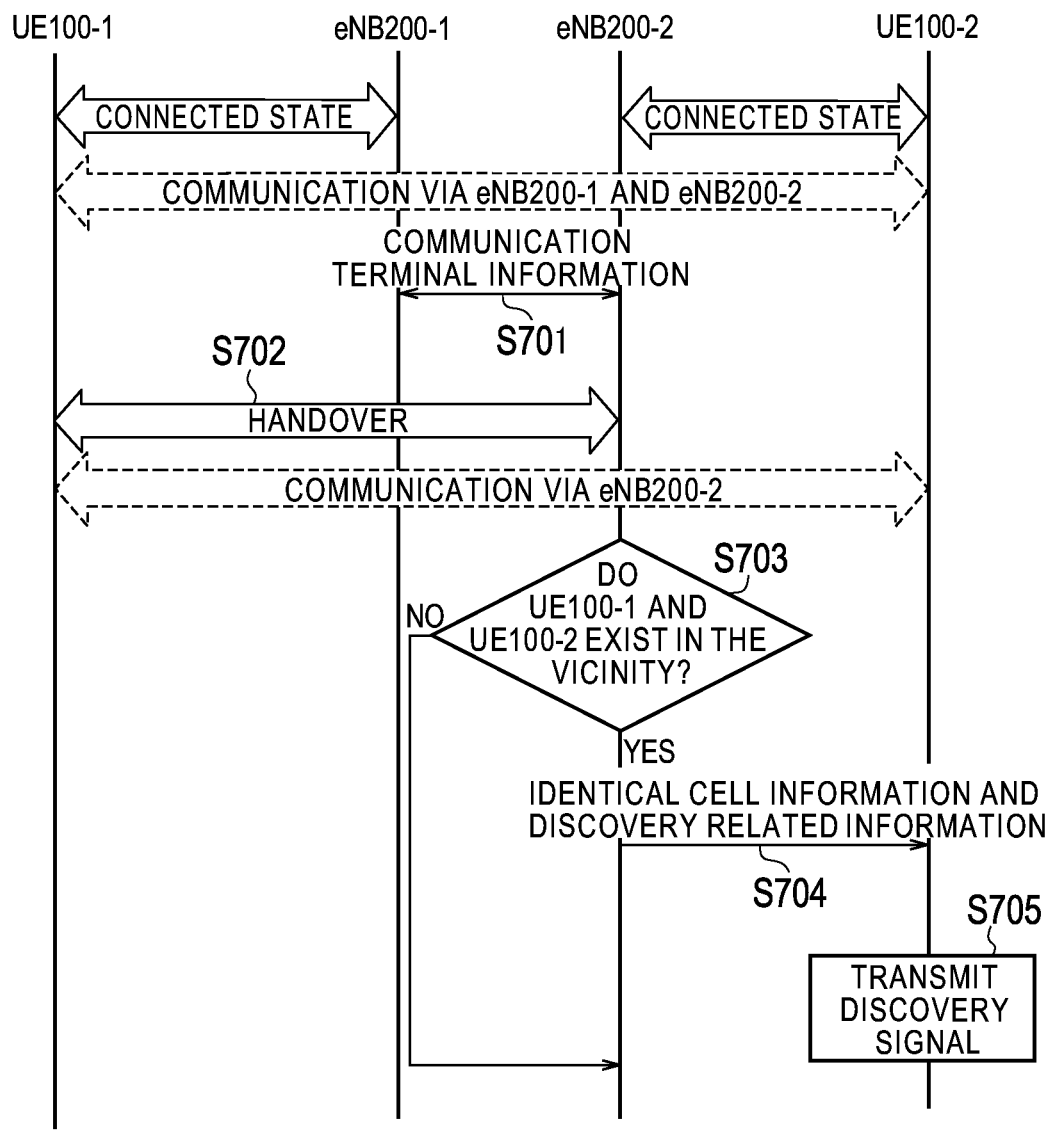
FIG. 15 is a sequence diagram illustrating an operation example of a mobile communication system according to a third embodiment.

FIG. 15 is a sequence diagram illustrating an operation example of the mobile communication system according to the third embodiment.

In FIG. 15, step 701 and step 702 correspond to step 501 and step 504 in the second embodiment, respectively (see FIG. 13).

As illustrated in FIG. 15, in step 703, the eNB 200-2 determines whether or not the UE 100-1 and the UE 100-2 exist in the vicinity. In the present embodiment, the eNB 200-2 determines that the UE 100-1 and the UE 100-2 exist in the vicinity when the connection cell of the UE 100-1 and the connection cell of the UE 100-2 are the same, that is, when the UE 100-1 and the UE 100-2 connect to the cell 250-2, that is, the self-cell. The eNB 200-2 determines, on the basis of the communication management list, whether or not the cell connected by the UE 100-1 is the same as the cell connected by the UE 100-2.

The eNB 200-2 does not transmit the information relating to the Discovery signal to the UE 100-2, when it is determined that the UE 100-1 and the UE 100-2 are not connected to the cell 250-2, that is, when it is determined that the UE 100-1 and the UE 100-2 do not exist in the vicinity ("No" in step 703). The eNB 200-2 ensures that the UE 100-2 does not transmit the Discovery signal.

On the other hand, when it is determined that the UE 100-1 and the UE 100-2 are connected to the cell 250-2, that is, when it is determined that the UE 100-1 and the UE 100-2 exist in the vicinity ("Yes" in step 703), the eNB 200-2 executes a process in step 704.

In step 704, the eNB 200-2 transmits identical cell information and the Discovery related information to the UE 100-2. The UE 100-2 receives the identical cell information and the Discovery related information.

Herein, the identical cell information is information indicating that the connection cell of the UE 100-1 and the connection cell of the UE 100-2 are the same. The identical cell information is transmitted, as information indicating that the UE 100-1 and the UE 100-2 exist in the vicinity, from the eNB 200-2.

It is noted that the UE 100-2 that received the identical cell information does not need to determine whether or not the connection cell of the UE 100-1 and the connection cell of the UE 100-2 are the same, and thus, the identifier indicating the connection cell may not be included in the identical cell information.

In step 705, the UE 100-2 that received the identical cell information transmits the Discovery signal. That is, the UE 100-2 starts transmitting the Discovery signal on the basis of the identical cell information.

Modification of Third Embodiment

Next, by using FIG. 16, an operation of a mobile communication system according to a modification of the third embodiment will be described. It is noted that description will be provided while focusing a portion different from the above-described first to third embodiments and each modification, and description of a similar portion will be omitted, where necessary.

In the above-described third embodiment, the eNB 200-2 transmits the identical cell information to the UE 100-2. In the present modification, the eNB 200-2 transmits, instead of the identical cell information, a request for transmitting the Discovery signal to the UE 100-2.

FIG. 16 is a sequence diagram illustrating an operation example of the mobile communication system according to the modification of the third embodiment.

In FIG. 16, step 801 to step 803 correspond to step 701 to step 703 in the third embodiment, respectively (see FIG. 15).

As illustrated in FIG. 16, in step 804, the eNB 200-2 transmits a Discovery request and the Discovery related information, to the UE 100-2.

Herein, the Discovery request is a request (instruction) used by the eNB 200 for causing the UE 100 to transmit the Discovery signal.

In step 805, the UE 100-2 that received the Discovery request transmits the Discovery signal. That is, the UE 100-2 starts transmitting the Discovery signal on the basis of the Discovery request.

Summary of Third Embodiment

In the present embodiment and modification, the eNB 200-2 transmits the identical cell information or the Discovery request to the UE 100-2 when the UE 100-2 and the UE 100-1 exist in the vicinity, and the UE 100-2 starts transmitting the Discovery signal on the basis of the identical cell information or the Discovery request. As a result, the eNB 200-2 is capable of controlling a transmission timing of the Discovery signal.

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

In the embodiments, the eNB 200 manages only one cell 250; however, the present invention is not limited thereto. For example, the eNB 200-1 may manage a plurality of cells 250. In this case, the eNB 200-1 has a plurality of communication terminal lists and neighbor cell lists for each of the plurality of cells 250. Even if the UE 100-1 is connected to one cell 250 managed by the eNB 200-1 and the UE 100-2 is connected to another cell 250 managed by the eNB 200-1, when it is determined by the movement of the UE 100-1 or the UE 100-2 that the UE 100-1 and the UE 100-2 exist in the identical cell 250, similarly to the above-described embodiments, the UE 100-1 may transmit the Discovery signal.

Further, in the above-described embodiment, the UE 100 or the eNB 200 determines whether or not the UE 100-1 and the UE 100-2 exist in the vicinity; however, the present invention is not limited thereto. For example, the MME/S-GW 300, that is an upper device of the eNB 200, may perform the determination. In this case, the MME/S-GW 300 has the communication terminal list and the neighbor cell list, and on the basis of the communication terminal list and the neighbor cell list, performs the determination. The MME/S-GW 300 instructs the eNB 200 that manages the cell 250 connected by the UE 100-1 and the UE 100-2 to transmit the Discovery signal to the UE 100-1 or the UE 100-2, when it is determined that the UE 100-1 and the UE 100-2 exist in the vicinity. The instructed eNB 200 transmits the identical cell information or the Discovery request to the UE 100-1 or the UE 100-2, similarly to the third embodiment.

Further, in the above-described embodiment, when the UE 100-1 and the UE 100-2 exist in the same cell, it is determined that the UE 100-1 and the UE 100-2 exist in the vicinity; however, the present invention is not limited thereto. For example, it may be determined from the location information of the UE 100-1 and the location information of the UE 100-2 that the UE 100-1 and the UE 100-2 exist in the vicinity.

Further, in the above-described embodiments, the cell identification information is transmitted to one of the UE 100-1 and the UE 100-2; however, the present invention is not limited thereto. For example, when the UE 100-1 and the UE 100-2 exist in the same cell, the eNB 200 that manages the cell may transmit the cell identification information to the UE 100-1 and the UE 100-2. Thus, the eNB 200 may cause the UE 100 to execute an inter-cell inter-frequency HO in order that the UEs 100 exist in the same cell 250, or may cause the same to execute an intra-cell inter-frequency HO after causing the same to execute an inter-cell intra-frequency HO. In this case, the eNB 200 may request the execution of the handovers on the basis of a result of Measurement Report transmitted from the UE 100.

Further, in the above-described embodiments, the UE 100 may preferentially transmit the data to the eNB 200, when a timing at which the Discovery signal is transmitted and a timing at which the data is transmitted to the eNB 200 overlap. That is, the UE 100 may transmit the Discovery signal after transmitting the data to the eNB 200. As a result, even the UE 100 not capable of simultaneously transmitting the Discovery signal and transmitting the data to the eNB 200 is capable of preferentially transmitting the data to the eNB 200, and thus, it is possible to transmit the Discovery signal without disturbing communication with another UE 100.

The UE 100 may request the Discovery related information to the eNB 200, when preferentially having transmitted the data to the eNB 200. As a result, the UE 100 is capable of transmitting the Discovery signal on the basis of the latest Discovery related information, and thus, it is possible to restrain the Discovery signal from becoming an interference signal to another UE 100 existing in the vicinity of the UE 100.

Further, the eNB 200 may transmit information indicating a radio resource capable of being used for transmitting the Discovery signal in the self-cell, via the X2 interface or the S1 interface, to the eNB 200 that manages the neighbor cell. Further, the eNB 200 may request another eNB 200 that manages the neighbor cell to transmit the information indicating the radio resource capable of being used for transmitting the Discovery signal in the neighbor cell, to the eNB 200. As a result, the eNB 200 is capable of including the information indicating the radio resource to be used for transmitting the Discovery signal not only in the self-cell but also in the neighbor cell, into the Discovery related information, and transmitting the same to the UE 100, and thus, it is possible to restrain the Discovery signal from becoming an interference signal to another UE 100 existing in the vicinity of the UE 100 in the neighbor cell. It is noted that the eNB 200 and the other eNB 200 may exchange not only the radio resource but also the other information, such as the transmission power, included in the Discovery related information.

Further, the eNB 200 may exchange the communication terminal information recorded regularly or irregularly, via the X2 interface or the S1 interface, with another eNB 200 that manages the neighbor cell described on the neighbor cell list so as to update the communication terminal information. For example, when the UE 100 of the eNB 200 executed the handover, the eNB 200 may exchange the communication terminal information as to update the communication terminal list.

Further, when the eNB 200 is installed within a range of the cell of another eNB 200, the transmission power of the Discovery signal may be decided so that the transmission power of the Discovery signal is smaller than the transmission power needed when the UE 100 connected to the cell managed by the eNB 200 communicates with the eNB 200.

Further, in the above-described second embodiment, when another UE 100 executed the handover, the eNB 200 transmits the partner terminal HO information to the UE 100 of the self-cell and then transmits the cell identification information; however, the eNB 200 may transmit, together with the partner terminal HO information, the cell identification information. It is noted that when the other UE 100 executed the handover to a cell not recorded on the neighbor cell list, the eNB 200 may transmit information indicating that the other UE 100 does not exist in the neighbor cell, to the UE 100 of the self-cell.

Further, in the above-described third embodiment, the eNB 200-2 transmits the cell identification information, the partner terminal HO information, or the identical cell information, to the UE 100-2 so as to inform the UE 100-2 that the UE 100-1 and the UE 100-2 exist in the vicinity; however, the present invention is not limited thereto. For example, the eNB 200-2 may inform the UE 100-2 that the UE 100-1 and the UE 100-2 exist in the vicinity by transmitting the Discovery related information. Specifically, the eNB 200-2 may transmit the Discovery related information only to the UE 100-2 (or/and the UE 100-1) that is determined to exist in the vicinity, when it is determined that the UE 100-1 and the UE 100-2 exist in the vicinity. In this case, the eNB 200-2 does not transmit the Discovery related information by broadcast. The UE 100-2 that received the Discovery related information is capable of determining that the UE 100-1 and the UE 100-2 exist in the vicinity by having received the Discovery related information. Therefore, the UE 100-2 is capable of starting transmitting the Discovery signal, triggered by the reception of the Discovery related information. As a result, the eNB 200-2 is capable of omitting the transmission of the information indicating that the UE 100-1 and the UE 100-2 exist in the vicinity, other than the Discovery related information.

The above-described embodiments and modifications may be combined, where necessary. For example, when the eNB 200 determines that the UEs 100 during communication exist in the vicinity of each other, the eNB 200 transmits, to the UE 100, the cell identification information and then the UE 100 may transmit the Discovery signal when the reception level of the reference signal transmitted from the cell reaches a predetermined threshold value, on the basis of the cell identification information.

It is noted that although not particularly mentioned in the above-described embodiments and modifications, also in a case of Locally Routed mode, it is also possible to start transmitting the D2D communication, by the same trigger as that in any of the above-described embodiments or modifications. In this case, the UE 100 does not need to transmit and receive the Discovery signal.

Further, although not particularly mentioned in the above-described embodiments and modifications, the UE 100 that receives the Discovery signal may be notified of the timing at which the Discovery signal is transmitted, from the eNB 200.

In the above-described embodiments, an example in which the present invention is applied to the LTE system has been described. However, the present invention may also be applied to systems, other than the LTE system, as well as the LTE system.

In addition, the entire content of U.S. Provisional Application No. 61/748,300 (filed on Jan. 2, 2013) is incorporated in the present specification by reference.

INDUSTRIAL APPLICABILITY

As described above, the mobile communication system, the user terminal, the base station and the processor according to the present invention are able to transmit a discovery-use signal at an appropriate timing, and thus are useful for a mobile communication field.

The invention claimed is:

1. A user terminal comprises:
a receiver configured to receive a System Information Block (SIB) transmitted by broadcast from a base station, the SIB including discovery information; and
a transmitter configured to directly transmit a discovery signal for discovering another user terminal existing in a vicinity of the user terminal, wherein
the discovery information includes resource information, transmission power information, and number information,
the resource information is information of a radio resource to be used for transmitting the discovery signal,
the transmission power information is information of transmission power to be used for transmitting the discovery signal,
the number information indicates a predetermined number of times to be used for deciding a number of discovery signal transmission times from the user terminal to the another user terminal, and
the user terminal further comprises a controller, wherein
the controller is configured to:
decide a radio resource used for transmitting the discovery signal on a basis of resource information;
decide transmission power used for transmitting the discovery signal on a basis of the transmission power information; and
decide a number of transmission times on a basis of the number information,
the transmitter is configured to directly transmit, to the another user terminal, the discovery signal the decided number of transmission times with the decided transmission power by use of the decided radio resource,
the discovery information further includes threshold information,
the threshold information indicates a predetermined threshold value to be used for determining whether or not the user terminal transmits the discovery signal based on the discovery information,
the controller is further configured to:
compare a Reference Signal Received Power (RSRP) of a reference signal from a serving cell of the base station transmitting the threshold information by the SIB with the predetermined threshold value indicated by the threshold information; and
determine whether or not the user terminal transmits the discovery signal, on a basis of the comparison of the RSRP with the predetermined threshold value, and
the transmitter is configured to directly transmit the discovery signal based on the discovery information in response to determining that the user terminal transmits the discovery signal.

2. The user terminal according to claim 1, wherein the controller is configured to request the radio resource used when the discovery signal is transmitted, from the base station.

3. The user terminal according to claim 1, wherein the controller is configured to preferentially transmit data to the base station when a timing at which the discovery signal is transmitted and a timing at which the data is transmitted to the base station overlap.

4. The user terminal according to claim 1, wherein
the receiver is configured to receive cell identification information from the base station when the another user terminal executes a handover, the cell identification information indicating a cell to which the another user terminal connects, and
the controller is configured to determine whether or not the user terminal transmits the discovery signal, on a basis of the cell identification information as well as the comparison.

5. A processor for controlling a user terminal, wherein the processor executes:
a process of receiving, a System Information Block (SIB) transmitted by broadcast from a base station, the SIB including discovery information including resource information, transmission power information, and number information;
a process of transmitting a discovery signal for discovering another user terminal existing in a vicinity of the user terminal;
a process of deciding a radio resource used for transmitting the discovery signal on a basis of resource information;
a process of deciding transmission power used for transmitting the discovery signal on a basis of the transmission power information;
a process of deciding a number of transmission times on a basis of the number information; and
a process of directly transmitting, to the another user terminal, the discovery signal the decided number of transmission times with the decided transmission power by use of the decided radio resource, wherein
the resource information is information of a radio resource to be used for transmitting the discovery signal,
the transmission power information is information of transmission power to be used for transmitting the discovery signal,
the number information indicates a predetermined number of times to be used for deciding a number of discovery signal transmission times from the user terminal to the another user terminal,
the discovery information further includes threshold information,
the threshold information indicates a predetermined threshold value to be used for determining whether or not the user terminal transmits the discovery signal based on the discovery information,
the processor executes:
a process of comparing Reference Signal Received Power (RSRP) of a reference signal from a serving cell of the base station transmitting the threshold information by the SIB with the predetermined threshold value indicated by the threshold information;
a process of determining whether or not the user terminal transmits the discovery signal, on a basis of the comparison of the RSRP with the predetermined threshold value; and
a process of directly transmitting the discovery signal based on the discovery information in response to determining that the user terminal transmits the discovery signal.

6. The processor according to claim 5, wherein the processor executes a process of requesting the radio resource used when the discovery signal is transmitted, from the base station.

7. The processor according to claim 5, wherein the processor executes a process of preferentially transmitting data to the base station when a timing at which the discovery signal is transmitted and a timing at which the data is transmitted to the base station overlap.

8. A communication method, comprising:
including, by a base station, discovery information into a System Information Block (SIB);
transmitting, from the base station to a user terminal, the SIB by broadcast;
receiving, by the user terminal, the SIB from the base station; and
directly transmitting, by the user terminal, a discovery signal for discovering another user terminal existing in a vicinity of the user terminal, wherein
the discovery information includes resource information, transmission power information, number information, and threshold information,
the resource information is information of a radio resource to be used for transmitting the discovery signal,
the transmission power information is information of transmission power to be used for transmitting the discovery signal,
the number information indicates a predetermined number of times to be used for deciding a number of discovery signal transmission times from the user terminal to the another user terminal,
the threshold information indicates a predetermined threshold value to be used for determining whether or not the user terminal transmits the discovery signal based on the discovery information, and
the communication control method further comprises:
comparing, by the user terminal, a Reference Signal Received Power (RSRP) of a reference signal from a serving cell of the base station transmitting the threshold information by the SIB with the predetermined threshold value indicated by the threshold information;
determining, by the user terminal, whether or not the user terminal transmits the discovery signal, on a basis of the comparison of the RSRP with the predetermined threshold value,
deciding, by the user terminal, a radio resource used for transmitting the discovery signal on a basis of resource information;
deciding, by the user terminal, transmission power used for transmitting the discovery signal on a basis of the transmission power information;
deciding, by the user terminal, a number of transmission times on a basis of the number information; and
directly transmitting, by the user terminal, to the another user terminal, the discovery signal of the decided number of transmission times with the decided transmission power by use of the decided radio resource, in response to determining that the user terminal transmits the discovery signal.

* * * * *